(12) United States Patent
Shimano

(10) Patent No.: US 6,717,906 B1
(45) Date of Patent: Apr. 6, 2004

(54) OPTICAL DISK APPARATUS TO PERFORM EITHER REPRODUCTION OR REPRODUCTION/RECORDING OF EACH OF AT LEAST TWO KINDS OF OPTICAL DISKS HAVING DIFFERENT SUBSTRATE THICKNESSES

(75) Inventor: Takeshi Shimano, Tokorozawa (JP)

(73) Assignee: Hitachi, Ltd., Tokyo (JP)

(*) Notice: Subject to any disclaimer, the term of this patent is extended or adjusted under 35 U.S.C. 154(b) by 689 days.

(21) Appl. No.: 09/614,191

(22) Filed: Jul. 11, 2000

(30) Foreign Application Priority Data

Jul. 27, 1999 (JP) ............................................. 11-211725

(51) Int. Cl.[7] ............................................... G11B 7/135
(52) U.S. Cl. ................................................. 369/112.26
(58) Field of Search .................... 359/719; 369/112.26, 369/112.08

(56) References Cited

U.S. PATENT DOCUMENTS

| 5,903,536 A | 5/1999 | Lee | 369/112 |
| 6,134,055 A * | 10/2000 | Koike | 359/724 |
| 6,222,812 B1 * | 4/2001 | Yoo et al. | 369/112.16 |

FOREIGN PATENT DOCUMENTS

| EP | 0865037 A1 * | 9/1998 |
| JP | 06-124477 | 5/1994 |
| JP | 08-055363 | 2/1996 |
| JP | 10-255305 | 9/1998 |

* cited by examiner

*Primary Examiner*—W. R. Young
*Assistant Examiner*—Michael Battaglia
(74) *Attorney, Agent, or Firm*—Kenyon & Kenyon

(57) ABSTRACT

To permit reproduction of a CD-R and the reproduction of a DVD in a compatible manner, both the aberration introduced by a substrate of a DVD having a 0.6 mm thickness and the aberration introduced by a substrate of a CD having a 1.2 mm thickness are reduced by a lens shape design where corresponding substrate thicknesses of the inner and outer regions of the objective lens are made different, and providing, in the inner region thereof, a protruding circular phase shifter and, also in a verge of the inner region, an annular phase shifter. The aberration of the objective lens in the CD reproduction was further decreased and the NA was increased up to 0. S, so that the recording of the CD-R was made possible.

2 Claims, 21 Drawing Sheets

Optimum substrate thickness

-- Prior Art --

Wavefront aberration
CD: 0.067 $\lambda$ rms (NA0.485)
DVD: 0.021 $\lambda$ rms

-- Prior Art --

Optimum substrate thickness

Effective NA for CD-R

- ◆— Conventional design (DVD Wrms=0.021 λ)
- ■— New design (DVD Wrms=0.021 λ)
- —— No aberration (λ=785nm, NA0.5)
- ------ Marechal's criterion (λ=785nm, NA0.5)
- ✱— Conventional design (DVD Wrms=0.025 λ)
- ○— New design (DVD Wrms=0.025 λ)
- ◇— Conventional design (DVD Wrms=0.029 λ)
- △— New design (DVD Wrms=0.029 λ)

FIG.8

Wavelength DVD:0.655 μm, CD:0.785 μm
DVD Wavefront aberration:0.029 λ rms
CD Normalized peak intensity:0.615,
Wavefront aberration:0.061 λ rms(Effective NA:0.509)
Optimum substrate thickness:Center:0.81mm,
Periphery:0.6mm(Boundary NA:0.475)
Circular phase shift CD:1.781 λ, DVD:2.134 λ (Boundary NA:0.182)
Annular phase shift CD:−1.781 λ, DVD:−2.134 λ (Boundary NA:0.275, 0.475)

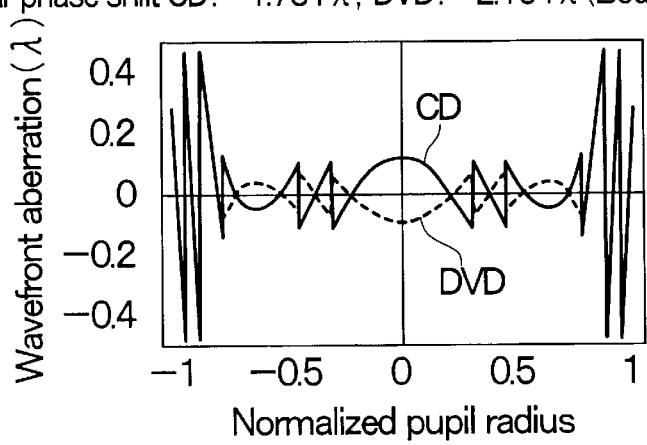

FIG.9

Wavelength DVD:0.655 μm, CD:0.785 μm
DVD Wavefront aberration:0.025 λ rms
CD Normalized peak intensity:0.603,
Wavefront aberration:0.065 λ rms(Effective NA:0.510)
Optimum substrate thickness:Center:0.78mm,
Periphery:0.6mm(Boundary NA:0.475)
Circular phase shift CD:1.780 λ, DVD:2.133 λ (Boundary NA:0.183)
Annular phase shift CD:−1.780 λ, DVD:−2.133 λ (Boundary NA:0.272, 0.475)

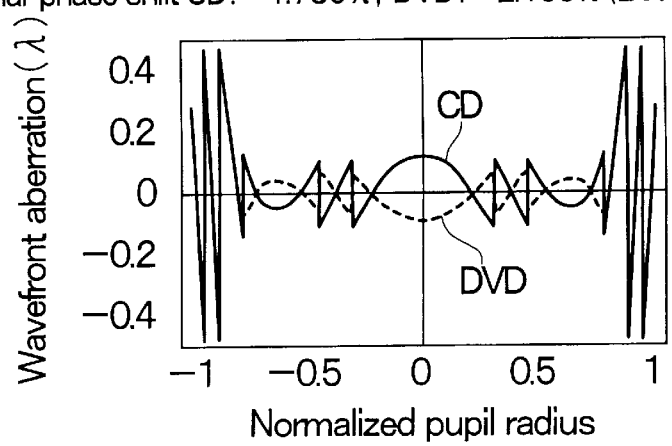

FIG.10
NA0.5  λ=0.785 μm
Rim:  0.76(x), 0.15(y)
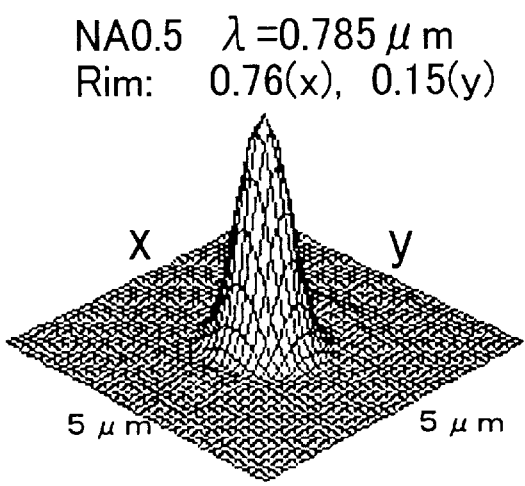
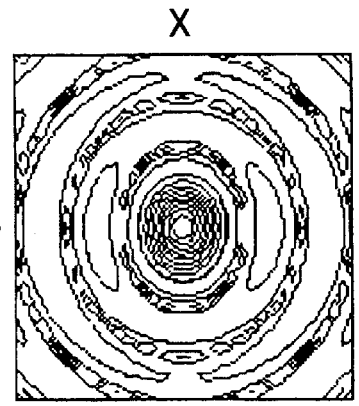
WHX= 0.79725  WHY= 0.90915
WEX= 1.27400  WEY= 1.47504
SDX= 0.02195  SDY= 0.00366
FIG.11
NA0.6  λ=0.785 μm
Rim:  0.671(x), 0.07(y)
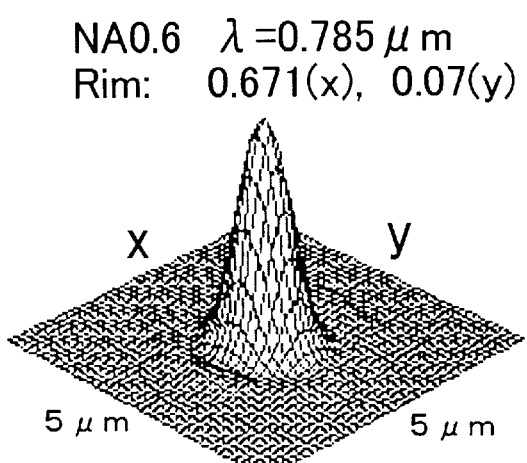
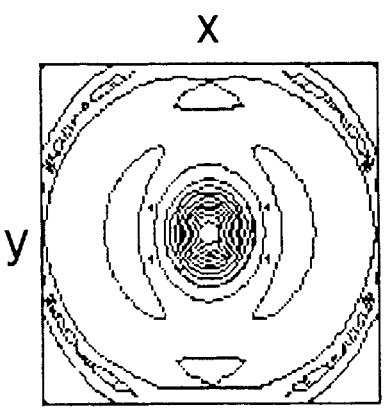
WHX= 0.80589  WHY= 0.91757
WEX= 1.28929  WEY= 1.48578
SDX= 0.02620  SDY= 0.00621

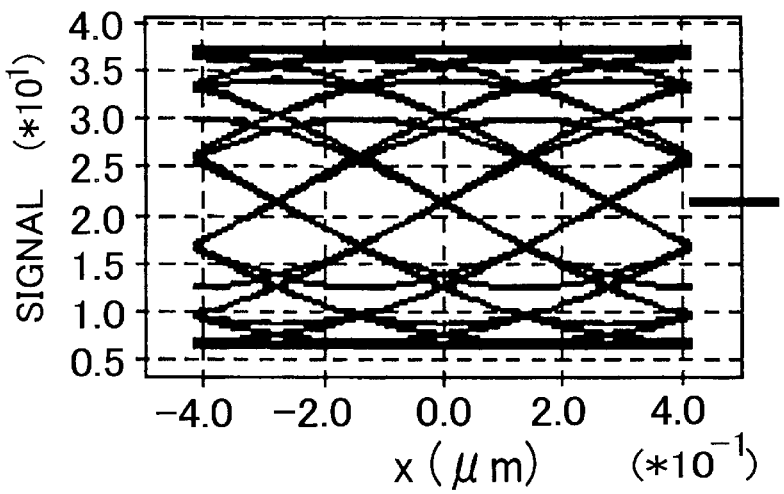
FIG. 14  Jitter: 3.4%
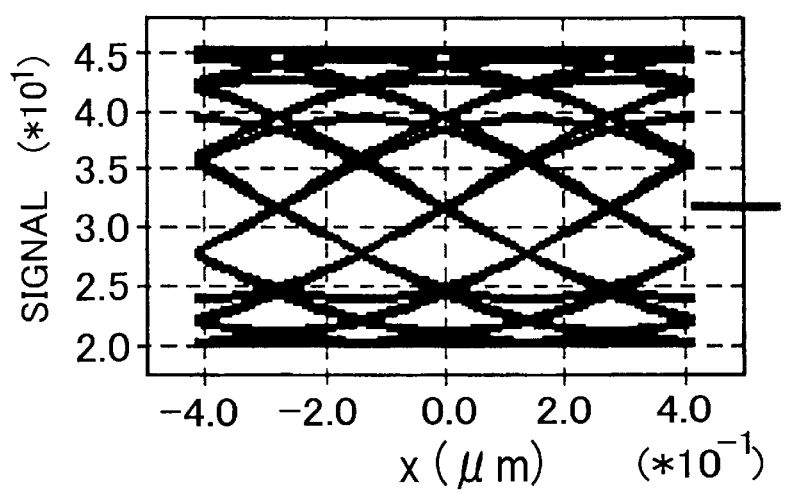
FIG. 15  Jitter: 4.3%
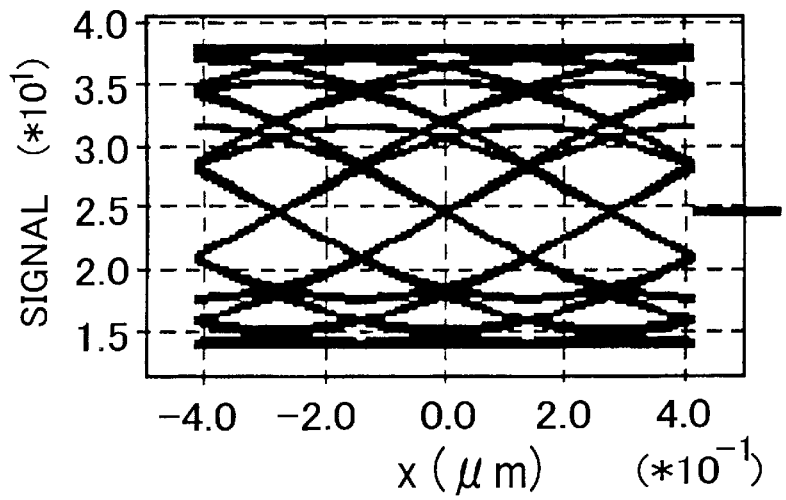
FIG. 16  Jitter: 4.4%

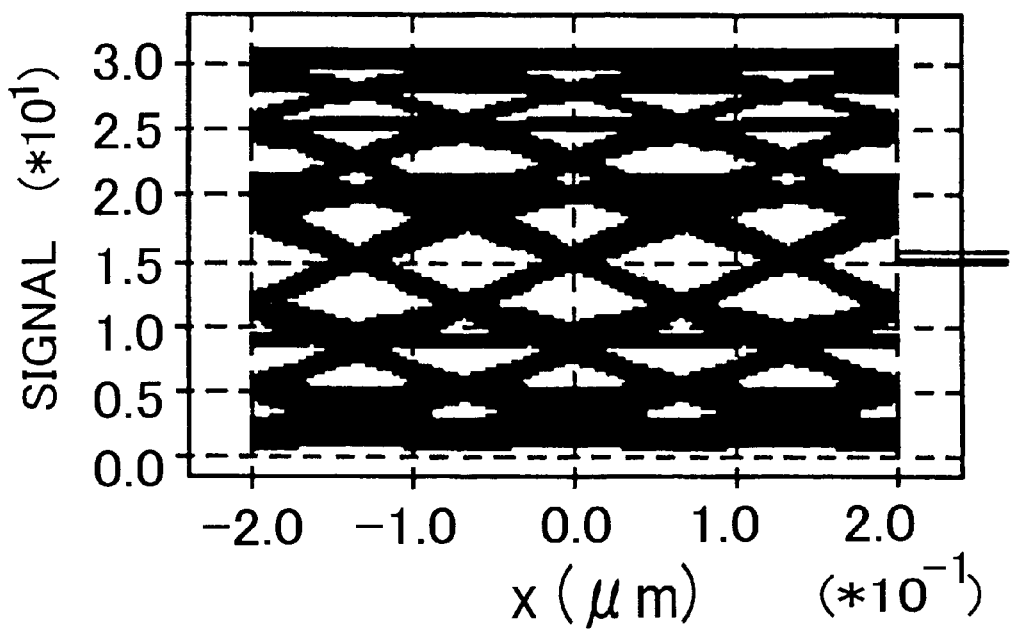
FIG. 17    Jitter: 7.6%
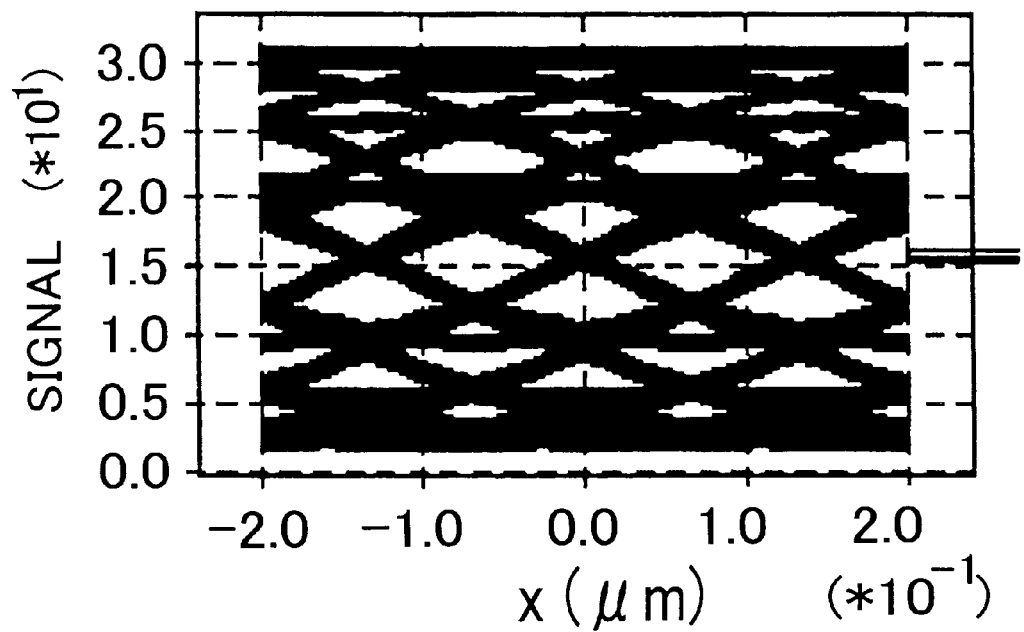
FIG. 18    Jitter: 7.9%

Deviation of inner rim radius of annular phase shifter(NA)

Deviation of inner rim radius of annular phase shifter(NA)

FIG.31

| | | | Possible design range 2) | | Tolerance 3) | Possible range (Total NA ratio) 6) | |
|---|---|---|---|---|---|---|---|
| | | | Lower | Higher | | Lower limit | Upper limit |
| Boundary radius (NA) | Rim of inner region | | 0.14 | 0.20 | ±0.04 | 0.13(0.22) | 0.21(0.35) |
| | Inner rim of annular region | | 0.25 | 0.29 | ±0.03 | 0.24(0.40) | 0.30(0.50) |
| | Outer rim of annular region | | 0.45 | 0.49 | ±0.02 | 0.45(0.75) | 0.49(0.82) |
| Phase shift ($\lambda$) | Circular region | CD | 1.81 | 1.74 | ±0.1 | 1.87 | 1.67 |
| | | DVD | 2.17 | 2.09 | ±0.1 | 2.24 | 2.00 |
| | Annular region | CD | -1.81 | -1.74 | ±0.1 | -1.87 | -1.67 |
| | | DVD | -2.17 | -2.09 | ±0.1 | -2.24 | -2.00 |
| Optimum substrate thickness of inner region (mm) | | | 0.85 | 0.74 | ±0.05 | 0.85 | 0.74 |

1) Wavelength : 655 nm(DVD), 785 nm(CD), Total NA : 0.6

2) The range where RMS wavefront aberration for DVD is 0.021-0.029 $\lambda$ and the central peak intensity of CD spot is larger than 0.8 times of that of no aberration (Marechal's criterion), referring to Fig.4,5,6 and 7.

3) The margin is defined at the threshold where the excess of the peak intensity over Marechal's criterion become half, referring to the figures from Fig.19 to 30 on the design of Fig.8.

4) The boundary radius of variation of the optimum substrate thickness coincides to the outer rim radius of annular phase shifter.

5) The phase shifts of circular and annular region are assumed to have the same absolute value and the opposite sign.

6) Possible range means the larger range of either possible design range or tolerance.

Surface shape function $$\tilde{x} = \frac{1}{2r_v} H_v^2 + \frac{1}{8}\left(\frac{1}{r_v^3} + b_v\right) H_v^4$$

NA=0.6           R =1.98            R₃=1.567500
R₁=0.600600      R₂=0.9075000       $d_{1A'}$=1.800000
$r_{1A}$=2.204245   $b_{1A}$=−0.0550148   $d_{1B'}$=1.800970
$r_{1B}$=2.209701   $b_{1B}$=−0.0534564
$r_2$=−10.17840     $b_2$=0.0501860
g =0.0002473     s₁=0.0020113       s₂=0.0020113

(mm)

OPTICAL DISK APPARATUS TO PERFORM EITHER REPRODUCTION OR REPRODUCTION/RECORDING OF EACH OF AT LEAST TWO KINDS OF OPTICAL DISKS HAVING DIFFERENT SUBSTRATE THICKNESSES

BACKGROUND OF THE INVENTION

The invention relates to an optical disk apparatus with the use of an objective lens, and specifically relates to an optical disk apparatus capable of compatible reproduction (i.e. playback, read out) of optical disks whose substrate thicknesses are different. Hereinafter, the playback of contents in a disk and the read out of data in a disk are referred to as "reproduction."

In recent years, the optical disks have been improved in their capacity toward much higher recording density. So that now a DVD-ROM (Digital Video Disk Read Only Memory) having a 4.7 GB capacity is commercially available by contrast with a CD-ROM which is a household, read-only optical disk having 0.65 GB. As the most important difference between theses two media, the DVD and the CD have different thicknesses in their substrates, namely 0.6 mm for the DVD, 1.2 mm for the CD. This difference comes from a fact that the DVD uses a higher numerical aperture (NA) of 0.6, larger than that of the CD 0.45, with the aim at improving the recording density, which is and hence it is prerequisite in the DVD to suppress the occurrence of aberration arising from disk tilt etc. Here, the NA stands for an indicator of the objective lens to represent how much it can collect rays, and is defined as the sine of the vertex angle of the largest cone of meridional rays that can enter or leave an optical system or element, multiplied by the refractive index of the medium in which the vertex of the cone is located. Since it is essential for a DVD drive device to be capable of reproducing the CD disks, such difference of disk thickness presents a problem in choosing the "corresponding substrate thickness" of the objective lens.

First of all, the meaning of this correspondence substrate thickness will be described. In optical disks, in order to avoid a situation where a disk becomes not-readable for its recorded information due to dust etc., the disk is normally reproduced with a focused beam from and through the back side of its transparent substrate made from polycarbonate etc. whose front surface was processed to have a recording layer thereon. In this configuration, for example in the case of the DVD whose substrate thickness is 0.6 mm, the spot size on the back side of the substrate becomes 0.5 mm or so; therefore it is less likely that dust having a size of approximately 0.1 mm or less affect the reproduction. Because of this effect, unlike magnetic disks, the user can change the optical disks and reproduce those in person. However, in cases where light is focused through a substrate as described above, it is necessary to design the objective lens so as to have an appropriate lens shape in accordance with the substrate thickness. For example, if a transparent substrate having a certain thickness is inserted halfway in a bundle of rays that are converging ideally, there occurs a situation where a ray incident normally to the substrate and a ray incident obliquely thereto take different optical paths of different lengths: naturally the latter has a longer optical path than the former. Such optical path difference is called aberration, which gives rise to a cause that prevents sharp focusing. However, such aberration can be compensated by modifying the lens shape, assuming that the thickness of the substrate is to be inserted is known beforehand. Therefore, in optical heads of optical disk apparatuses, normally used are an objective lens that is made to match a thickness of the optical disk to be reproduced, after specifying the substrate thickness. As described above, the corresponding substrate thickness is defined as a substrate thickness such that when the substrate is inserted halfway in the bundle of convergent rays focused by a certain objective lens, that objective lens can focus the rays ideally without introducing aberrations.

Since normally each objective lens for optical disk has a unique corresponding substrate thickness, this fact became a problem when reproducing the DVD and the CD in a compatible manner.

To overcome this problem, for example, in the Japanese Published Unexamined Patent Application No. 6-124477, disclosed is a method where the numerical aperture of an objective lens for DVD is limited and hence rays passing through a peripheral part of the objective lens for DVD where the aberration is large are blocked, so that the aberration due to an error of the substrate thickness in the CD reproduction with the use of the lens for DVD is reduced. An aberration caused by the error of the substrate thickness is called a spherical aberration, which increases in proportion to the fourth power of NA. Consequently, if the NA is reduced with an aperture for a lens, the aberration of the lens is reduced accordingly. On the other hand, when reproducing the DVD, the lens is used without the aperture so that the light is not blocked thereby, being in a changeover manner. Here, this conventional example is intended to reproduce the CD by using light of a 650 nm wavelength which is a reproduction wavelength for the DVD. That is, the wavelength in this case is shorter than the 780 nm wavelength which is conventionally used for the CD. If a wavelength is shorter, a necessary NA can be decreased because the focused spot size is proportional to $\lambda/NA$, where $\lambda$ denotes the wavelength. Therefore, the reproduction of the CD with the 650 nm wavelength light allows to reduce the NA of the aperture below 0.45 accordingly and thereby a necessary effect of reducing the aberration is achieved in the conventional example. However, the conventional example has a drawback that it cannot accommodate to the reproduction of the CD-R (CD-Recordable) that has a compatibility with the CD and is also a writable medium, currently becoming popular so much. This is because the CD-R uses a dye medium in its recording layer that has enough reflectance only at the 780 nm wavelength and the reflectance decreases at the 650 nm wavelength, namely the reproduction wavelength of the DVD, whereby a signal cannot be reproduced from the DVD. So it is necessary to mount a light source of the 780 nm wavelength separately to reproduce the CD-R. In this occasion, the wavelength becomes identical to that of a conventional optical head for CD and therefore it is necessary for the aperture limit NA to be set to no less than 0. 45, the value of the aperture limit NA for the conventional case, so that a sufficient effect of reducing the aberration can hardly be achieved by aperture limit.

Further, as another conventional example, in the Japanese Published Unexamined Patent Application No. 9-237431, disclosed is a method of blocking rays passing through a certain annular region of a lens. This example uses a method where, by blocking rays passing through the annular region where the aberration begins to change largely in the CD reproduction with the use of the objective lens for DVD, only the region that deteriorates directly the CD reproducing light spot is virtually removed. The reason for this configuration is that rays passing through a region that introduces a significantly large aberration consist of a wavefront of large inclination and each ray travels in a direction perpendicular to the wavefront, and consequently these rays disperse very largely from the focal position, so that substantially the rays do not affect the light spot quality by any means. In the DVD reproduction, rays passing through regions inside and outside the light-blocking annular region are focused virtually without the aberration. At this time, rays passing through the light-blocking annular region are blocked also in the DVD reproduction. By adjusting the width of that region so that loss in the light amount and deterioration of the light spot due to the light blocking are controlled to be within an allowance, virtually the same effect as that of the liquid crystal can be obtained without the liquid crystal. However, since this contrivance is virtually equivalent to the case of limiting the aperture, the method cannot be applied to the reproduction of the CD-R.

Furthermore, other prior art technology is described in the Japanese Published Unexamined Patent Application No. 8-55363. In this method, two kinds of optical disks having different thicknesses are reproduced by using light sources having different wavelengths. The two laser diodes are arranged with different distances set from the objective lens and the spherical aberration introduced by this particular arrangement is used to compensate the spherical aberration introduced by the error of the substrate thickness. With this method, the DVD and the CD can be reproduced with a single objective lens in a compatible manner while a 780 nm wavelength laser diode is used for the reproduction of the CD and a 650 nm wavelength laser diode is used for the reproduction of the DVD, and additionally the CD-R can be reproduced. However, it is known that when two light sources are arranged at different positions like this, the tolerance of relative displacement between the laser diode and the objective lens becomes narrower. This is because there exists a so-called sine condition that prescribes a condition in a design of an objective lens wherein, even when the incident angle of the incident light deviates from the proper angle, the coma aberration does not increase rapidly and this condition can stand only for a specific object-image distance. Therefore it cannot stand for two kinds of the object-image distances. That is, if the arrangement of the 650 nm wavelength laser diode satisfies the sine condition, that of the 780 nm wavelength laser diode cannot satisfy this condition.

In such a case, for example, if the disk rotates eccentrically, the objective lens is made to move in tracking the track of the rotating disk, and in return this movement breaks the relative positional relation between the objective lens and the laser diodes, hence increasing the aberration very rapidly.

Yet furthermore described is a prior art technology, for example, in the Japanese Published Unexamined Patent Application applied for by the present inventors et al. In FIG. 1 of this application, fabricated is an objective lens 1 that has the corresponding substrate thickness of 0.76 mm in an inner region 11 and that of 0.6 mm in an outer region 12 and is further provided with the annular phase shifter 13 consisting of a recessed annular groove. The corresponding substrate thickness of the phase-shifting annular region is set to 0.76 mm, the same value as that of the inner region 11. In this objective lens 1, in order to mitigate the difference between the corresponding substrate thickness for the CD and that for the DVD, the corresponding substrate thickness in the inner region 11 plus a region of the annular phase shifter 13 is set to 0.76 mm, which is a compromise value for 0.6 mm for the DVD, with an intention to get close to 1.2 mm for the CD to effect the reduction of the aberration introduced in the inner region in the CD reproduction; and further, in order to reduce residual aberration and to reduce also the aberration introduced due to the error of the substrate thickness in the DVD reproduction, the annular phase shifter 13 is employed. By the way, in the above-mentioned conventional example where either one of two beams of different wavelengths entering the objective lens is not a parallel beam, there occurs a problem that the aberration of that beam increases abruptly when the objective lens is displaced in a direction perpendicular to its optical axis by the tracking. On the contrary, both the 650 nm wavelength light and the 780 nm wavelength light are intended to enter this objective lens as parallel beams; therefore this configuration has a merit of being free from the above-mentioned problem.

FIG. 2 is a diagram showing the calculated wavefront aberration profiles in the DVD reproduction and in the CD reproduction in the conventional example. Here, the wavefront aberration is represented as the deviation of optical path length from a laser diode serving as a light source to the focus of an object lens as a function of a ray position in the bundle of effective rays (pupil). However, in FIG. 2, the aberration exceeding a range of $-0.5\lambda$ to $+0.5\lambda$ is reduced to a value within the range, which has virtually the same optical effect as that of the value before reduction. The phase shift of the annular phase shifter is assumed to be $-1.7\lambda$ in the CD reproduction. Here, a negative phase shift means shortening of the optical path and the step causing such is a recess. Then, a positive phase shift of 0.24 X, which is obtained by reducing the amount of $-1.76\lambda$ to a value within the range of $-0.5\lambda$ to $+0.5\lambda$ through the addition of $2\lambda$, is virtually introduced in the CD reproduction. On the other hand, the introduced aberration becomes $-1.76\lambda/(1.583-1)$.times. 780/650. times. $(1.586-1)=-2.12\lambda$ in the DVD reproduction, assuming the refractive index at 780 nm to be 1.583 and that at 650 nm to be 1.586, respectively. Then, in the same manner as mentioned above, a negative phase shift of $-0.12\lambda$, which is obtained by reducing $-2.12\lambda$ to a value within a range of $-0.5\lambda$ to $+0.5\lambda$ through the addition of $2\lambda$ is virtually introduced. Since the sign of the phase shift required at each wavelength is previously determined, the effect like this is not equivalent for the case where the annular phase shifter is a recess and for the case where it is a protrusion. For example, here we will consider how much phase shift is required when using a protruding phase shifter. Assuming that the phase shift in the CD reproduction is $+3.24\lambda$, the necessary phase shift is calculated as $3.24/(1.583-1)$.times.$780/650$.times.$(1.586-1)=3.91\lambda$, which is reduced to $-0.09\lambda$ by subtracting 4 2. therefrom so as to find a value within the range of $-0.5\lambda$ to $+0.5\lambda$. However, when the absolute value of the original phase shift including an integer part becomes large as in the above case, the fabrication of the lens becomes difficult not only because the step to be formed becomes deeper but also because the phase shift error arising from the deviation of the wavelength caused by the temperature variation etc. will increase almost in proportion to the integer part $(2n7\pi)$ of the original phase shift. Therefore, it is preferable that the step is a recess in the design. Regarding the wavefront aberration obtained in the above procedure as shown in FIG. 2, in order to focus the light spot excellently, it is necessary for its RMS value to be, for example, $0.07\lambda$ or less ($\lambda$ being a light wavelength) according to the Marechal's criterion. On the contrary, in the DVD reproduction, the RMS wavefront aberration becomes $0.02\lambda$, indicating excellent performance. In the CD reproduction, although the wavefront aberration is significantly large at a peripheral part of the lens, the wavefront aberration in the range of an effective NA by design satisfies the above-mentioned criterion. The rays passing through the peripheral part of the lens suffer an increasingly large aberration; therefore a wavefront consisting of these rays has a large angle of inclination. Consequently such rays disperse easily and do not affect the light spot composed of virtually the rays passing through the central part of the lens by any means. In this way, the compatibility in the reproduction of the DVD, CD, and CD-R can be realized with this design.

However, in the conventional example mentioned above where the annular phase shifter is integrated with the objective lens to form a single-piece body, there is a problem that the lens is originally designed not for the recording of the CD-R but only for the reproduction of the CD-R; therefore the reduction of the aberration is not sufficient as a CD-R recording device. This problem came from a fact that it is necessary to use an objective lens having an NA of 0.5 which is larger than the NA necessary for the reproduction of the CD in order to form recording marks comparable to recorded information pits of the CD with a high degree of accuracy in a CD-R recording device. The conventional example mentioned above is intended to perform only the reproduction of the CD-R in addition to the reproduction of the CD-ROM, hence beings capable of only focusing a light spot equivalent to that of the CD-ROM optical pick-up having an NA of 0.45 at the 780 nm wavelength. Therefore in the range of an NA of 0.5, the objective lens has an increased aberration, so that the objective lens cannot cope with the recording of the CD-R where an NA of 0.5 is indispensable.

SUMMARY OF THE INVENTION

In consideration of the above-mentioned problems, it is the object of the present invention and a problem to be solved thereby to provide an optical disk apparatus that uses an objective lens capable of reproducing the DVD and recording the CD-R in a compatible manner.

To solve the above-mentioned problem, in the objective lens having at least two refraction planes according to the above-mentioned conventional example, a circular region in the vicinity the optical axis of the lens is protruded so as to provide a step at least on one plane of the two refraction planes.

That is, a circular phase shifter whose phase shift direction is reversed to that of the annular phase shifter is provided additionally on the objective lens. With this modification, the unevenness of the wavefront aberration profile in the central region in FIG. 2 can be mitigated, hence reducing the RMS wavefront aberration, and the diameter of the bundle of effective rays in the CD reproduction can be increased, hence achieving a lens performance of focusing a light spot necessary for the recording of the CD-R.

Further, in modifying the lens in this manner, as described in the conventional example mentioned above, at least this phase-shifting circular region is designed to have an optimum substrate thickness closer to 1.2 mm of the CD substrate thickness rather than 0.6 mm of the DVD substrate thickness. In other words, as far as only this region is concerned, the aberration when reproducing the optical disk whose substrate thickness is more than 0.6 mm becomes smaller than that when reproducing the optical disk whose substrate thickness is 0.6 mm. Moreover, at the same time, an outer region beyond the annular region is designed to have an optimum substrate thickness of 0.6 mm so as to be optimized for the DVD. That is, this outer region has a shape such that the aberration is minimized when reproducing the optical disk whose substrate thickness is 0.6 mm.

Specifically, this particular design becomes most effective, denoting the ratio of the diameter of the above-mentioned circular region to that of the bundle of total effective rays as $D_1$, a ratio of the diameter of the inner rim of the above-mentioned annular region to that of the bundle of total effective rays as $D_2$, and a ratio of the diameter of the outer rim of above-mentioned annular region to that of the bundle of total effective rays as $D_3$, when these parameter are set to satisfy the following conditional expressions:

$0.22 \leq D_1 \leq 0.35$, (expression)

$0.40 \leq D_2 \leq 0.50$, (expression)

$0.75 \leq D_3 \leq 0.82$, (expression)

$D_1 \leq D_2 \leq D_3$. (expression)

Further, in this objective lens, the effect of reducing the aberration becomes larger when the substrate thickness that introduces the smallest aberration at least in rays passing through above-mentioned circular region is set between 0.74 mm and 0.85 mm. Further, an optical head capable of reproducing the DVD and recording the CD-R in a compatible manner can be realized only by integrating this objective lens with at least two laser diodes emitting different wavelength beams, a lens, a mirror, a photodetector, etc. to construct an optical head in a single structural combination.

Further, in the objective lens to be used in such an optical head furnished with two wavelength light sources like these, denoting optical path differences generated by the steps in the above-mentioned circular region and in the annular region as $\phi_1$ and $\phi_2$, respectively, and the longer wavelength of the two wavelengths, namely the wavelength for the reproduction of the CD, as $\lambda_1$, the performance thereof is enhanced most effectively when these parameters are set to satisfy the following conditional expressions:

$1.67\lambda_1 \leq \phi_1 \leq 1.87\lambda_1$, (expression)

$-1.87\lambda_1 \leq \phi_2 \leq -1.67\lambda_1$. (expression)

In this case, denoting the shorter wavelength of the two wavelengths, namely the wavelength for the reproduction of the DVD, as $\lambda_2$, $\phi_1$ and $\phi_2$ are assured to satisfy the following conditional expressions at the same time:

$2.00\lambda_2 \leq \phi_1 \leq 2.24\lambda_2$, (expression)

$-2.24\lambda_2 \leq \phi_2 \leq -2.00\lambda_2$. (expression)

Further, an optical head capable of reproducing the DVD and recording the CD-R in a compatible manner can be realized only by integrating this objective lens comprising these steps with at least two laser diodes emitting different wavelength beams, a lens, a mirror, a photodetector, etc. to construct an optical head in a single structural combination.

Further, an optical disk apparatus capable of reproducing the DVD and recording the CD-R in a compatible manner can be realized only by integrating this optical head with a mechanism, a control circuit, etc. all of which serves to perform the reproducing or the recording/reproducing of at least two kinds of optical disks having different substrate thicknesses to construct an optical disk apparatus in a single structural combination.

BRIEF DESCRIPTION OF THE DRAWINGS

FIG. 8 is a diagram showing an example of a calculated wavefront aberration profile of the objective lens according to the present invention.

FIG. 9 is a diagram showing an example of a calculated wavefront aberration profile of a second objective lens according to the present invention.

FIG. 10 is a diagram showing a calculated profile of the conventional CD-R recording light spot.

FIG. 11 is a diagram showing a calculated profile of the conventional CD-R recording light spot focused by the objective lens according to the present invention that gives the wavefront aberration profile of FIG. 8.

FIG. 14 is a diagram showing a calculated eye pattern for a CD-ROM reproducing signal reproduced with a light spot focused by a conventional objective lens for CD-R shown in FIG. 10.

FIG. 15 is a diagram showing a calculated eye pattern for a CD-ROM reproduced signal reproduced with a light spot focused by the objective lens according to the present invention shown in FIG. 11 (detection NA=0.6).

FIG. 16 is a diagram showing a calculated eye pattern for a CD-ROM reproduced signal reproduced with a light spot focused by the objective lens according to the present invention shown in FIG. 11 (detection NA=0.5).

FIG. 17 is a diagram showing a calculated eye pattern for a DVD-ROM reproduced signal reproduced with a light spot focused by the conventional objective lens for DVD shown in FIG. 12.

FIG. 18 is a diagram showing a calculated eye pattern for a DVD-ROM reproduced signal reproduced with a light spot focused by the objective lens according to the present invention shown in FIG. 13.

FIG. 31 is a table which summarizes the range of parameters of the optimum lens shape and their tolerances.

DESCRIPTION OF THE PREFERRED EMBODIMENTS

Figure 1:
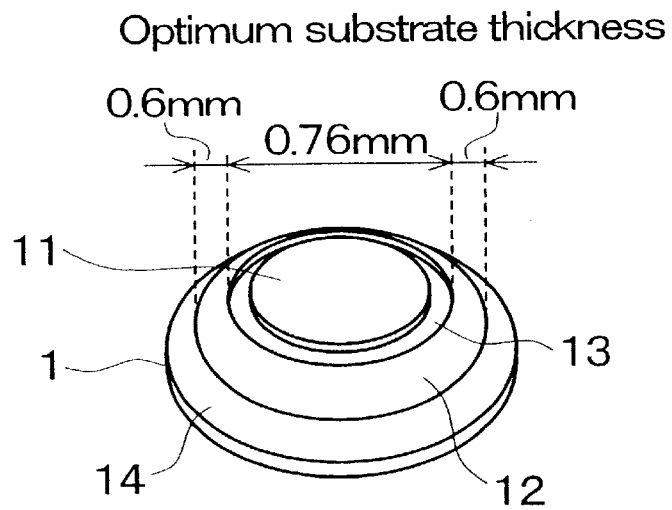
FIG. 1 is an illustration showing a schematic shape of a DVD/CD-R compatible lens of a conventional example.

Hereinafter, referring to the drawings, one embodiment according to the present invention will be described.

Figure 3:
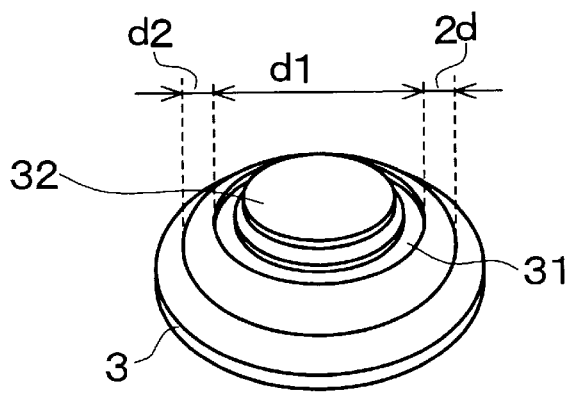
FIG. 3 is an illustration showing a schematic shape of the object lens according to the present invention.

FIG. 3 is an illustration showing the schematic of the objective lens 3 according to the present invention. Here, in the same manner as the objective lens shown in FIG. 1, an optimum substrate thickness of an inner region (the central region including the annular phase shifter 31) is denoted as $d_1$, and that of an outer region (a region beyond the inner region) is denoted as $d_2$. It is recommended that $d_2$ should be 0.6 mm for the compatible reproduction of the DVD, CD, and CD-R. In order to reduce both aberrations arising from this error of the substrate thickness in the DVD reproduction and in the CD reproduction by means of phase-shifting of a smaller absolute value, the annular phase shifter 31 consists of a recessed annular groove, in the similar manner as the above-mentioned conventional example. In addition, a protruding circular phase shifter 32 is provided inside the annular phase shifter 31. By adding this, the aberrations in the CD reproduction and in the DVD reproduction are intended to be reduced further.

Figure 4:
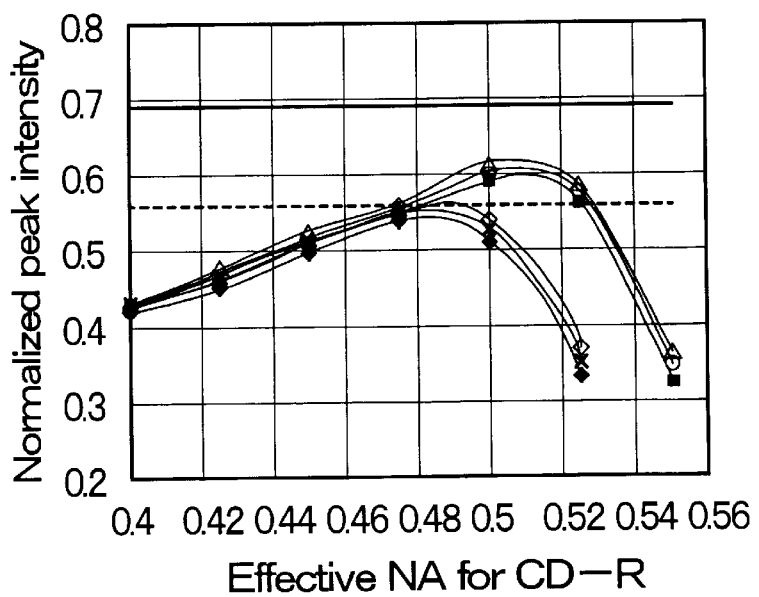
FIG. 4 is a diagram showing a comparison of the normalized center peak intensities of the CD light spots by the conventional design and according to the present invention as a function of an effective NA for CD-R.

FIG. 4 is a diagram showing the normalized center peak intensities of the DVD reproducing light spot focused by the objective lenses which are fabricated either by a method using the annular phase shifter described in the conventional example mentioned above or on the design using a new lens shape proposed this time as a function of the effective NA for CD-R, for different wavefront aberrations that are allowed in the reproduction of the DVD. Wavelengths in the CD reproduction and in the DVD reproduction are 0.785 μm and 0.655 μm, respectively, the DVD reproduction NA is 0.6, and the substrate thicknesses of the CD and the DVD are 1.2 mm and 0.6 mm, respectively. In optimizing the objective lens, the phase difference in the circular region is made to be equal to that in the annular region in the absolute value, wherein a positive phase shift (increasing the optical path) is given in the circular region and a negative phase shift (decreasing the optical path) is given in the annular region, and a boundary of the inner and outer regions where the optimum substrate thickness changes is set to coincide with the outer rim of the annular region. Here, the normalized center peak intensity, as described in the conventional example mentioned above of the Japanese Published Unexamined Patent Application No. 10-255305, stands for the ratio of the peak intensity of the focused light spot to the total light amount within the effective NA of a lens in concern assuming that a parallel beam having a uniform intensity distribution enters in the region of the effective NA, which is equal to the so-called Strehl intensity times a squared ratio of the effective NA to the total NA. The Strehl intensity is equivalent to $1-(2\pi W_{rms}/\lambda)^2$, where $W_{rms}$ denotes the RMS wavefront aberration and $\lambda$ denotes the wavelength, and it is said to be necessary to satisfy the Strehl intensity $\geq 0.8$, namely $W_{rms} \approx 0.07\lambda$ or less according to the Marechal's criterion that is a criterion for the allowable aberration.

However, the inventors suggest here that when aberrations exist, mere Strehl intensity is not appropriate to determine an optimum aperture limit NA as an evaluation index. The is because the Strehl intensity is the criterion of evaluating the aberrations when the NA is fixed, and therefore cannot be applied to cases where light spots have different NAs, as is the present case, to judge their quality. For a zero aberration case, the larger the NA, the smaller the light spot; for a non-zero aberration case, the larger the NA, the larger the aberration, and hence deterioration of the light spot becomes more significant. Therefore there is sure to exist an optimum NA where the aberration and the NA are balanced and the inventors use here the above-mentioned normalized center peak intensity as the evaluation index for it. For example, assuming that the above-mentioned total NA is 0.6, the normalized center peak intensity is unity for the zero aberration case and the light spot for the recording of the CD-R has an NA of 0.5, and accordingly the normalized center peak intensity thereof is $(0.5/0.6)^2=0.694$. If the CD-R recording light spot has the aberration of the Marechal's criterion, it is necessary for the normalized center peak intensity to be multiplied by 0.8, hence being 0.556. It is therefore necessary for a light spot with the aberration to have a normalized center peak intensity equal to 0.556 or more. In FIG. 4, the normalized center peak intensity of this CD-R recording light spot with zero aberration is represented by a thick solid line and that with an aberration just satisfying the Marechal's criterion is represented by a broken line. Curves for design values are divided into two groups: one group of the curves does not surpass the broken line even at their peaks; the other group surpasses the broken line in the range of an NA of 0.48 to 0.53 or so. The former consists of calculated curves on the conventional design values; the latter consists of calculated curves by a new design method. A plurality of curves in each group correspond to different cases each of which is for a different RMS wavefront aberration to be allowed in the DVD reproduction; the curves from the top to the bottom are for a wavefront aberration of $0.029\lambda$, $0.025\lambda$, and $0.021\lambda$, respectively. Aberration values of such extents are sufficiently small compared to the critical value just satisfying the Marechal's criterion, and therefore can be allowed as residual aberration by design. Moreover, it goes without saying that the larger the allowable aberration value for the DVD, the higher the quality of the CD reproducing light spot, and the larger the normalized center peak intensity. As can be understood from the foregoing, if the effective NA of the CD light spot is set to approximately 0.51, the CD-R recording light spot whose quality surpasses the Marechal's criterion for the CD-R recording light spot can be realized.

Figure 5:
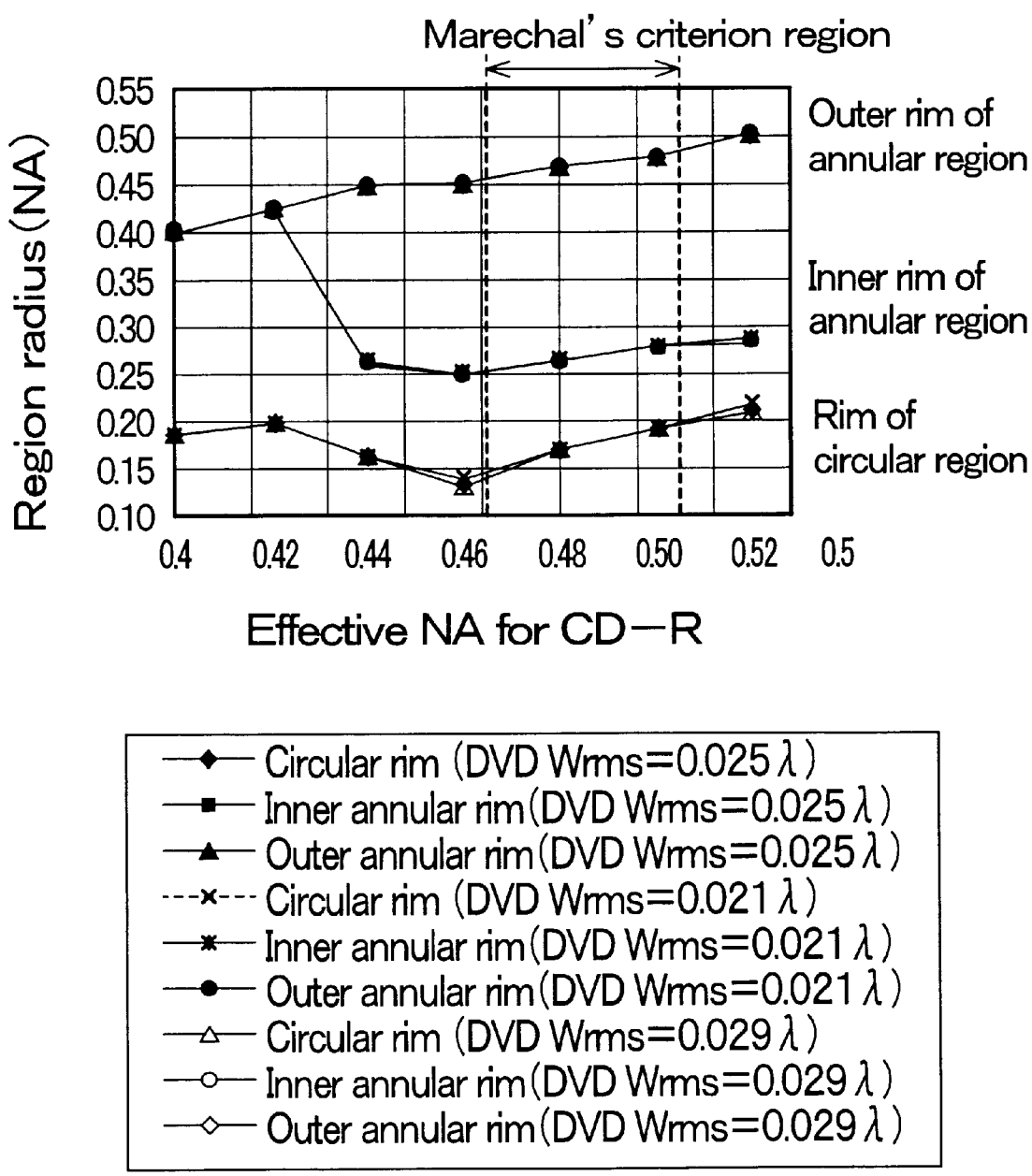
FIG. 5 is a diagram showing design values (in unit of NA) for a radius of a circular region, an inner rim radius of an annular region, and an outer rim radius of the annular region according to the present invention as a function of the effective NA for CD-R.

FIG. 5 is a diagram showing design values of the radius of the circular region, the inner rim radius of the annular region, and the outer rim radius of the annular region (all of these being indicated in unit of NA) in the design of the new shape in FIG. 4 as a function of the effective NA for CD-R, where the vertical axis indicates boundaries of these regions in unit of NA. Each set of design values (NA) for the above-mentioned regions are plotted for different allowable aberration values in the DVD reproduction shown in FIG. 4 at the same time in one figure, which shows almost superposed plotting in terms of allowable aberration. From the figure, it is understood that locations of region boundaries (indicated in unit of NA) almost do not depend on the allowable aberration value in the DVD reproduction. These values of region boundaries that satisfy the Marechal's criterion are approximately 0.14–0.20 (all indicated in unit of NA) for the radius of the circular region, approximately 0.25–0.29 for the inner rim radius of the annular region, and approximately 0.45–0.49 for the outer rim radius of the annular region. The fact that the inner rim radius and the outer rim radius of the annular region coincide in a range of an NA of 0.42 or less indicates that the normalized center peak intensity is higher for cases without the annular region, and in such cases the designed values are shown to coincide with the effective NA.

Figure 6:
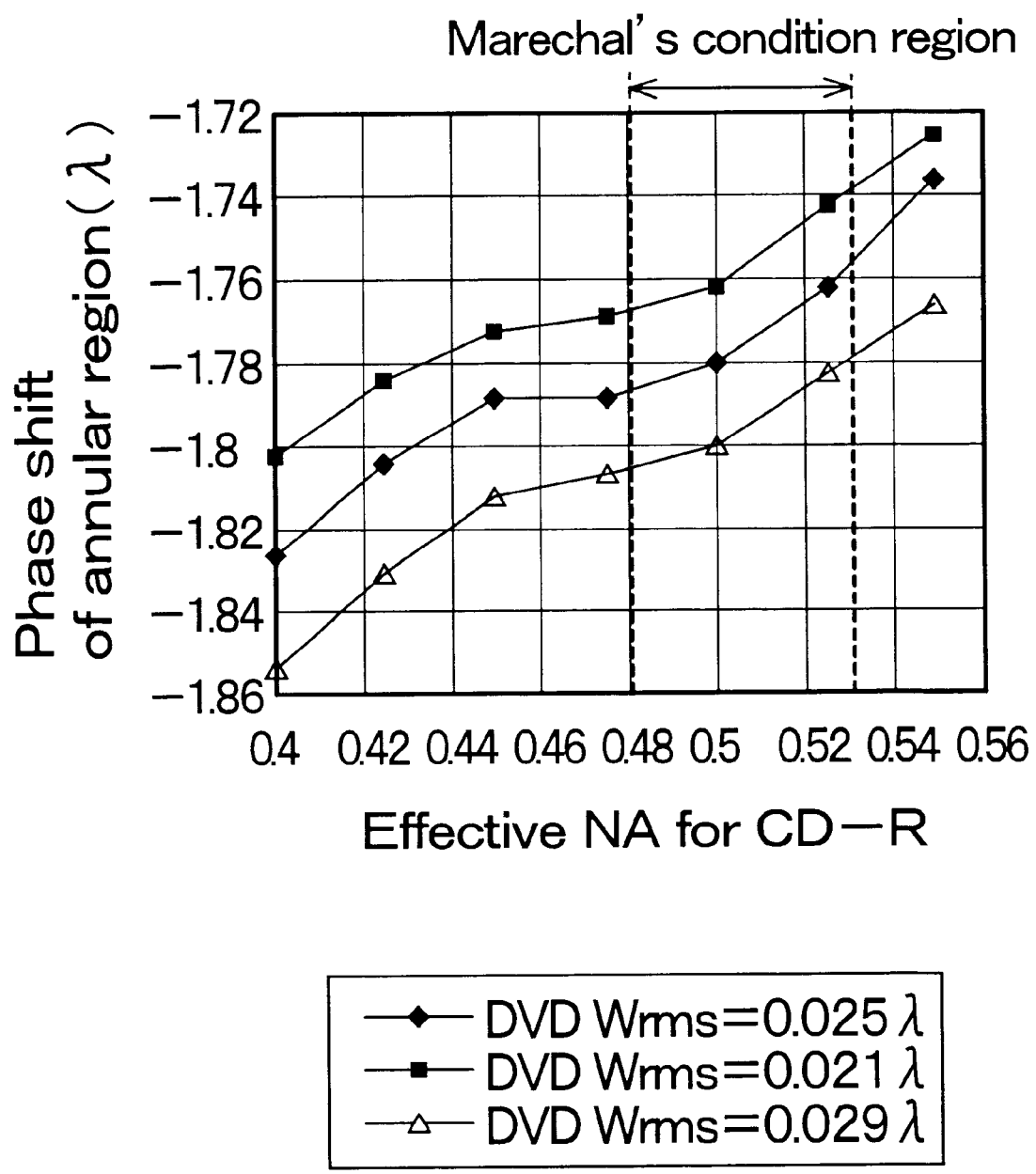
FIG. 6 is a diagram showing design values for the phase shift of the annular region according to the present invention as a function of the effective NA for CD-R.

FIG. 6 is a diagram showing the phase shift of the annular region as a function of the effective NA for CD-R in the design according to the present invention shown in FIG. 4. By the way, as already stated, the phase shift in the circular region is made equal to that in the annular region in the absolute value, whereas its sign is reversed. From the results, the phase shift of the annular region depends on the allowable aberration value in the DVD reproduction. For allowable aberrations ranging from 0.021λ to 0.029λ, the Marechal's criterion is satisfied with the phase shift of the annular region ranging approximately from −1.81λ to −1.74λ, where λ is a wavelength for the reproduction of the CD, 0.785 μm.

Figure 7:
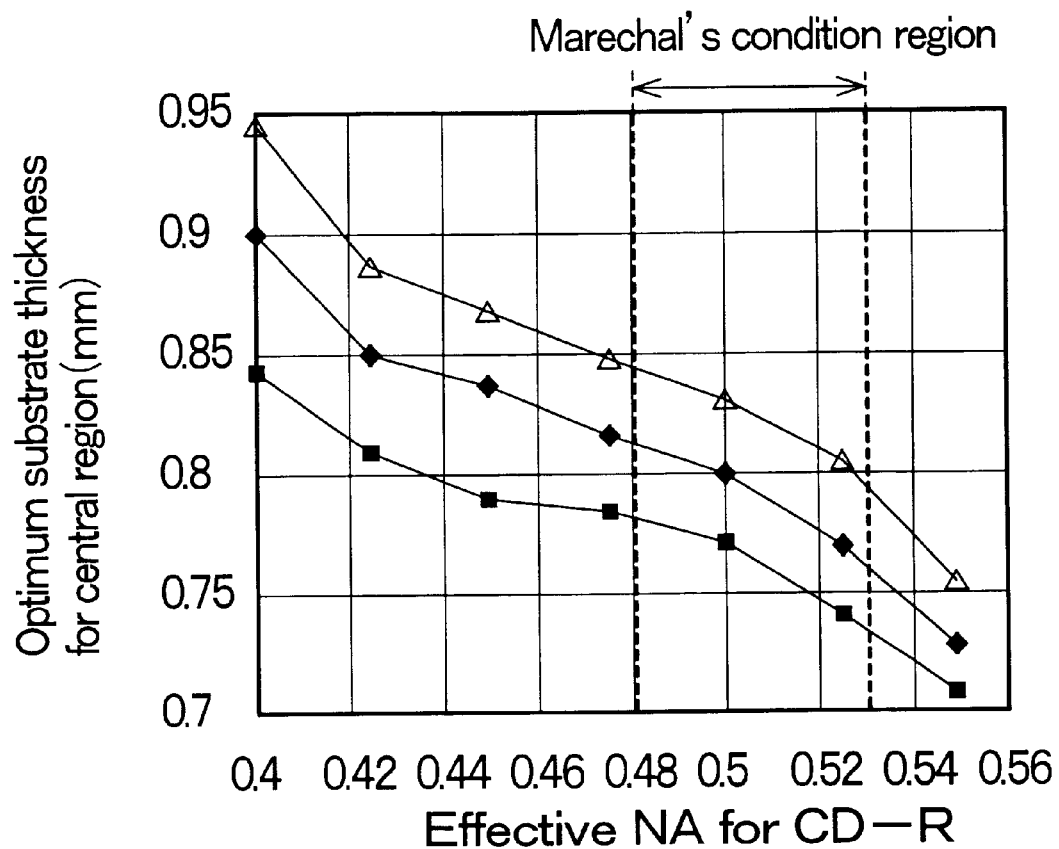
FIG. 7 is a diagram showing design values for the optimum substrate thickness of the inner region according to the present invention as a function of the effective NA for CD-R.

FIG. 7 is a diagram showing the optimum substrate thickness of the inner region as a function of the effective NA for CD-R in the design according to the present invention of FIG. 4. Here, as already stated, the boundary of the change of the optimum substrate thickness is brought together with the outer rim radius of the annular region. From the figure, it was found that the optimum substrate thickness of the inner region depends on the allowable aberration value in the DVD reproduction and, for the allowable aberrations ranging from 0.021λ to 0.029λ, lies in a range of approximately 0.85 to 0.74 mm. Since if an allowable aberration value in the DVD reproduction is larger, so much the more suitable shape for the CD is allowed; therefore the optimum substrate thickness of the inner region gets closer to 1.2 mm. In addition, since if the effective NA in the CD reproduction is smaller, so much the narrower the region suitable for the CD becomes; therefore the optimum substrate thickness of the inner region closer to 1.2 mm is allowed.

Figure 2:
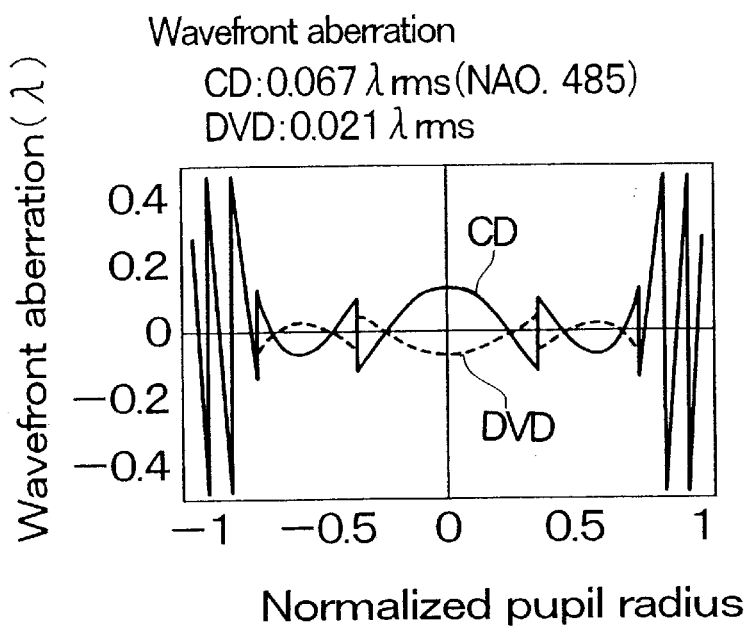
FIG. 2 is a diagram showing a wavefront aberration profile for the DVD/CD-R compatible lens of the conventional example.

FIG. 8 is a diagram showing a wavefront aberration profile, which gives perhaps a highest normalized center peak intensity, that was found as a result of searching therefor in the design example when the allowable wavefront aberration value in the DVD reproduction is 0.029λ in FIG. 4. The effective NA for CD at this time was 0.509. Although stepped parts increased in number compared to the results of FIG. 2, it was found that a region of a low aberration in the CD reproduction is extended. In this case, the optimum substrate thickness of the inner region is 0.81 mm; the phase shifts in the CD reproduction are 1.781λ in the circular phase shifter and −1.781λ in the annular phase shifter, respectively; and the phase shifts in the DVD reproduction are 2.134λ in the circular phase shifter and −2.134λ in the annular phase shifter, respectively. If these values are reduced to being within the range of −0.5λ to +0.5λ by adding or subtracting integer 2 to or from the aberration, the phase shifts for the CD are −0.219λ in the circular phase shifter and 0.219λ in the annular phase shifter; and the phase shifts for the DVD are 0.134λ in the circular phase shifter and −0.134λ in the annular phase shifter. These values indicated in the graph actually effect the phase-shifting except a small difference caused by the term 2nπ due to possible wavelength variation. Regarding the NAs at boundaries, the NA at the outer rim of the circular phase shifter is 0.182, the NA at the inner rim of the annular phase shifter is 0.275, and the NA at the outer rim of the annular phase shifter is 0.475, whereas the NA for the recording of the CD-R is 0.509.

FIG. 9 is a diagram showing a wavefront aberration profile in the design example that was found as a result of searching for a highest normalized center peak intensity in the CD reproduction when the allowable wavefront aberration in the DVD reproduction is 0.025λ in FIG. 4 with the aim of improving more or less the wavefront aberration for the DVD from that of the embodiment of FIG. 8. In this case, the optimum substrate thickness of the inner region is 0.78 mm; the phase shifts for the CD are 1.78λ in the circular phase shifter and −1.78λ in the annular phase shifter, respectively; and the phase shifts for the DVD are 2.133λ in the circular phase shifter and −2.133λ in the annular phase shifter, respectively. If these values are reduced to being within ±0.5λ by adding or subtracting integer 2 to or from the aberration, the phase shifts for the CD are −0.22λ in the circular phase shifter and 0.22λ in the annular phase shifter, respectively; and the phase shifts for the DVD are 0.133λ in the circular phase shifter and −0.133λ in the annular phase shifter, respectively. Regarding NAs at boundaries, the NA at the rimer of the circular phase shifter is 0.183, the NA at the inner rim of the annular phase shifter is 0.272, and the NA at the outer rim of the annular phase shifter is 0.475, whereas the NA for the recording of the CD-R is 0.51.

FIG. 10 is a diagram showing the calculated profile of a light spot on the disk surface produced by a conventional CD-R recording optical head. In the figure, the left is a bird's-eye view, and the right is a contour map for the same profile. By the way, in this figure, the wavelength of the light spot is 785 nm, the NA is 0.5, and the intensities of the incident light at the lens edge (rim intensity) are assumed to be 0.76 in the x side and 0.15 in the y side in the figure, and further its intensity distribution is assumed to be a Gaussian distribution. Moreover, numerical values indicated below the contour map are the spot sizes and the side-lobe intensities, where WHX and WEY are the full widths at half maximum in the x and y directions, respectively, and WEX and WEY are the full widths at a 1/e^2 intensity in the x and y directions, respectively, and SDX is the ratio of a side-lobe center intensity to the peak intensity in the x direction and SDY is that in the y direction. The spot sizes are all represented in unit of μm.

FIG. 11 is a diagram showing, as a comparison to FIG. 10, the calculated profile of the CD-R recording light spot focused by the objective lens according to the present invention that gives a wavefront aberration profile which is, for example, shown in FIG. 8. Here, the NA of the lens for collecting rays is 0.6, which is calculated in considering rays passing through the peripheral part of the lens that introduces a large aberration. The rim intensity is decreased by the amount comparable to a larger NA than that of FIG. 10 as a matter of course. From the results, although the spot size is slightly increased compared to the spot size shown in FIG. 10, the increment is only 1% or so, which is considered to be virtually within a variation and nonsignificant.

Figure 12:
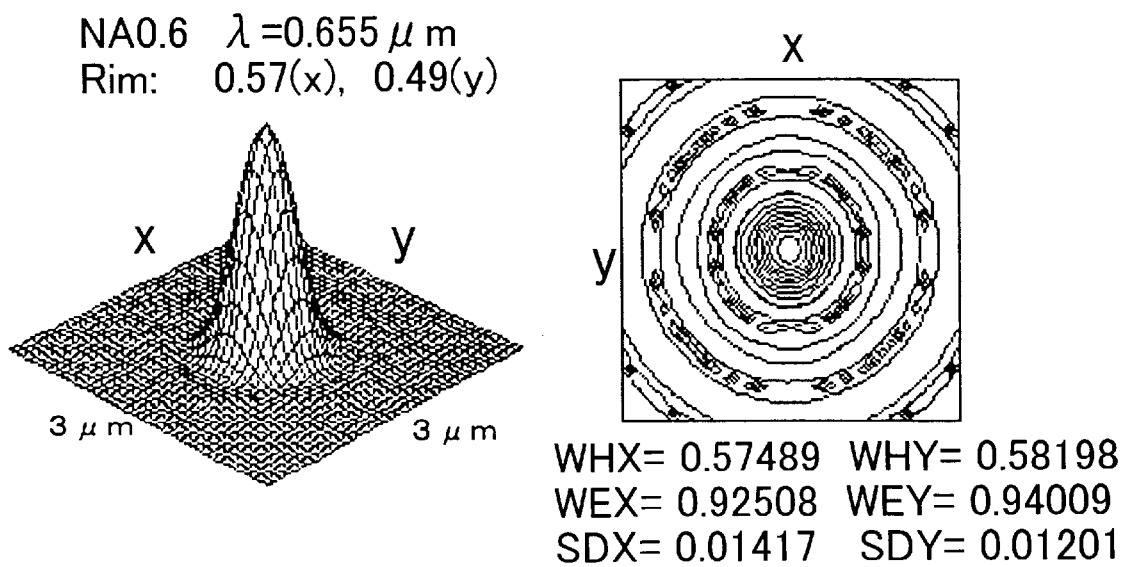
FIG. 12 is a diagram showing a calculated profile of a DVD reproducing light spot focused by the conventional objective lens only for DVD.

FIG. 12 is a diagram showing, in the same manner as FIG. 10, the calculated light spot profile in the DVD reproduction at the 655 nm wavelength with a conventional lens only for DVD. Here, an intensity distribution of the incident light on the object lens is similarly assumed to be a Gaussian distribution, having a rim intensity of 0.57 in the x direction and that of 0.49 in the y direction.

Figure 13:
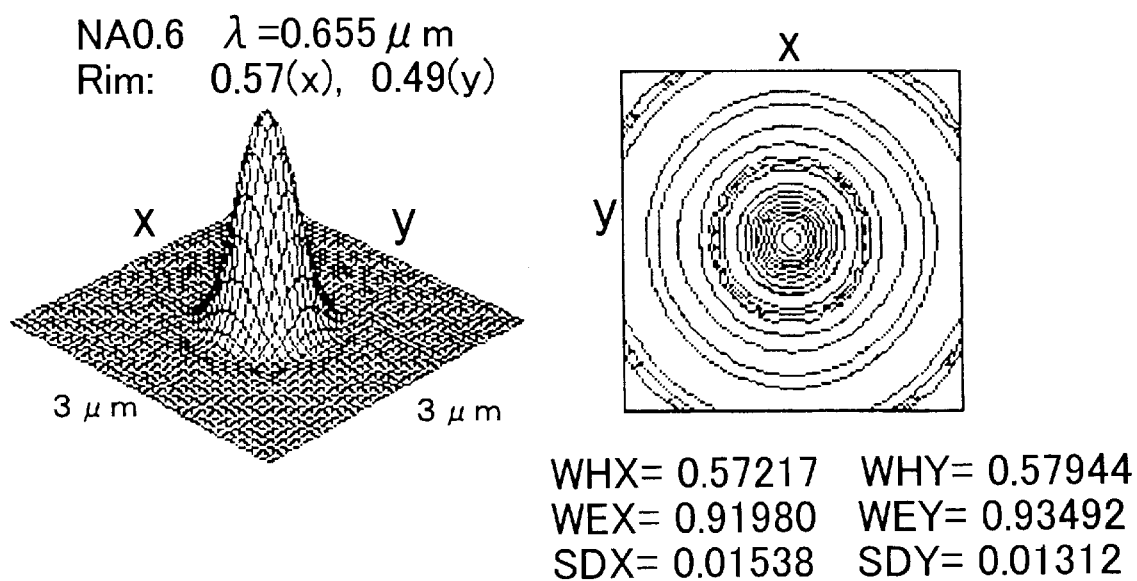
FIG. 13 is a diagram showing a calculated profile of a DVD reproducing light spot focused by the objective lens according to the present invention that gives the wavefront aberration profile of FIG. 8.

In contrast to this, FIG. 13 is a diagram showing the calculated profile of the light spot when the DVD is reproduced at the 655 nm wavelength with the objective lens according to the present invention whose wavefront aberration profile is shown in FIG. 8. Conditions of the incident light are the same as that of FIG. 8. Results of FIG. 13 indicate that a light spot whose spot size and side-lobe intensity are almost the same as those of FIG. 12 is obtained.

FIG. 14 is a diagram showing the calculated eye-pattern of the reproduced signal when the CD-ROM is reproduced with the light spot focused by the conventional objective lens for CD-R shown in FIG. 10. The eye-pattern is a superposition of reproduced signals of random code patterns of the CD-ROM which are synchronized to the regenerated clock and is equivalent to signals displayed synchronously on an oscilloscope using build ups of the reproduced signals as triggers. An evaluation index of the signal quality is an opening width of the crossings of the lattice in a central part, and specifically, used is a jitter of the timing of the reproduced signals with respect to the clock that is represented as a standard deviation of the temporal displacement, normalized by a time length corresponding to the lattice width (detection window width), and shown in percentages. This value was 3.4% in FIG. 14. However, crosstalk from the adjacent tracks and variation in the slice level of approximately 1% to the maximum reflected light amount are assumed. Normally, the reproduced signal jitter of the optical head for CD-ROM having an NA of 0.45 is considered to be 6 to 7% or so in an ideal condition, and therefore it was found that an increased NA of 0.5 due to the compatibility in the CD-R recording as well as in the CD reproduction took the effect.

FIG. 15 is a diagram showing the calculated eye-pattern of the reproduced signal, by the same calculation as in FIG. 14, when the CD-ROM is reproduced with the light spot focused by the objective lens according to the present invention shown in FIG. 11. Although the jitter increased slightly as much as 4.3%, this effect is small enough to be neglected when compared to the effect of the increased NA. However, here it is assumed for the detected light that the whole rays within an NA of 0.6 are received.

FIG. 16 is a diagram showing the calculated eye-pattern of the reproduced signal, in the same calculation as FIG. 15, assuming that only rays passing through the central part of the lens that introduces a small aberration are received in the detected bundle of rays. In an actual optical head, the rays passing through the peripheral part of the lens suffer an increasingly large aberration; therefore a wavefront consisting of these rays has a large angle of inclination. Consequently such rays disperse from the light-detecting areas, hence not being detected. Even taking into account the influence like this, the value of jitter hardly changes and this fact indicates that it is not necessary to use a spatial filter for limiting the aperture such as a liquid crystal etc. jointly with the objective lens according to the present invention.

FIG. 17 is a diagram showing the calculated eye-pattern of the reproduced signal when the DVD-ROM is reproduced with the light spot focused by the conventional objective lens for DVD shown in FIG. 12. In the case of the DVD, the light spot is reduced in size compared to the case of the CD, but the recording density are increased further than a value that is allowed in consideration of its reduction effect; therefore the jitter is obviously larger than that in the case of the CD. In this case the calculated value of the jitter was 7.6%.

FIG. 18 is a diagram showing the calculated eye-pattern of the reproduced signal when the DVD-ROM is reproduced with the light spot focused by the objective lens according to the present invention shown in FIG. 13. The calculation results indicates that the eye pattern does not exhibit a noticeable change compared to that of the objective lens only for DVD in FIG. 17 and the jitter is increased only slightly, so that it is found that little influence can be observed on the whole.

Figure 19:
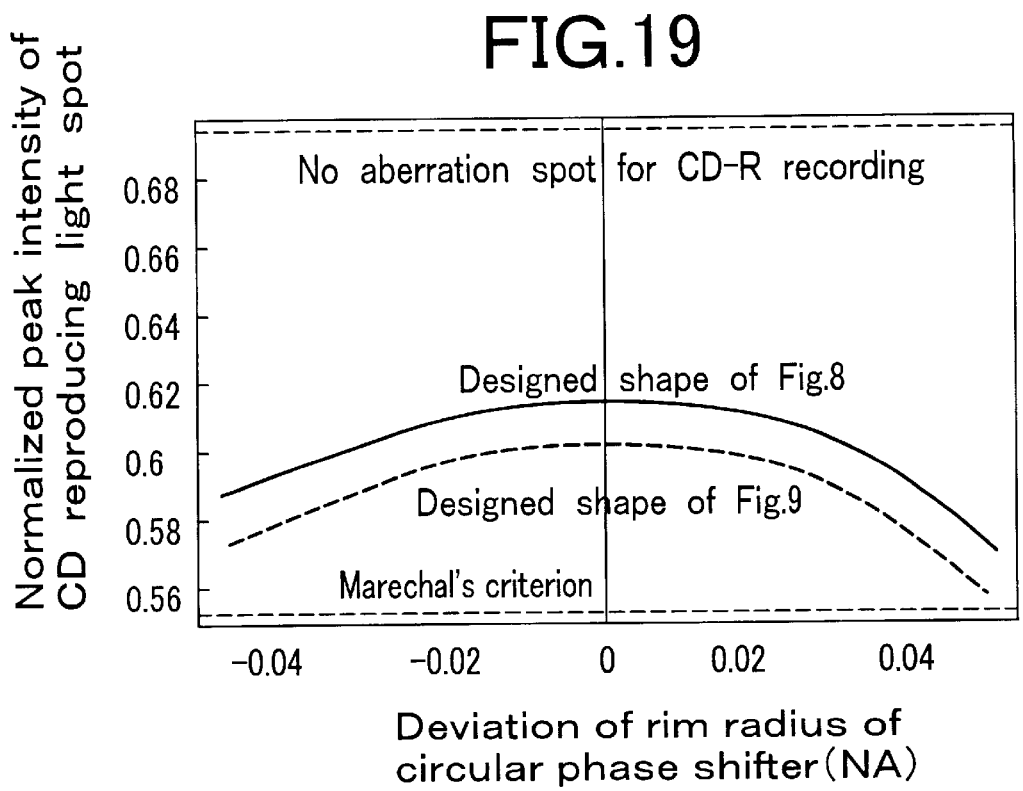
FIG. 19 is a diagram showing normalized center peak intensity of the CD-R light spot versus the NA of the radius of the circular region in a design example shown in FIG. 8 and FIG. 9.

FIG. 19 is a diagram showing variation of the normalized center peak intensity for the CD obtained through the calculation when only the NA of the circular region is varied in the design example shown in FIG. 8 and FIG. 9. For example, if a tolerance is assumed to be a variation of the NA by which the noramrized peak intensity deteriorates to effect the decrease in the margin of the Marechal's criterion to one-half the initial value, the tolerance is found to be approximately ±0.04 in NA value.

Figure 20:
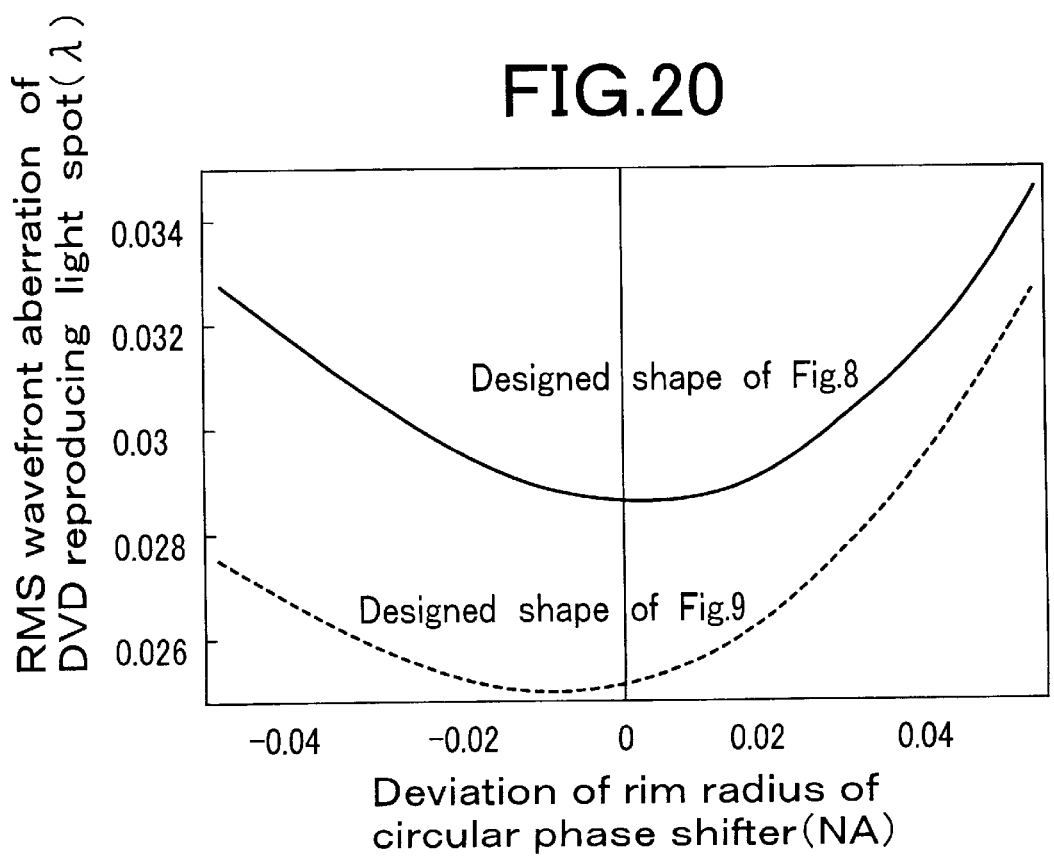
FIG. 20 is a diagram showing RMS wavelength aberration in the DVD reproduction versus the NA of the radius of the circular region in the design example shown in FIG. 8 and FIG. 9.

FIG. 20 is a diagram showing variation of the RMS wavefront aberration in the DVD reproduction obtained through the calculation when only the NA of the circular region is varied, in the similar manner as in FIG. 19. The results of FIG. 20 indicates a wider allowable deviation of the rim radius of the circular phase shifter, which stands in contrast to the deterioration of the normalized center peak intensity of the CD reproducing light spot shown in FIG. 19, and it is found that the increment in the RMS wavefront aberration of the DVD reproducing light spot introduced by the deviation of the rim radius of the circular phase shifter as large as the above-mentioned ±0.04 (NA) hardly causes the deterioration of the normalized center peak intensity, when considering the Marechal's criterion that requires the RMS wavefront aberration of $0.07\lambda$.

Figure 21:
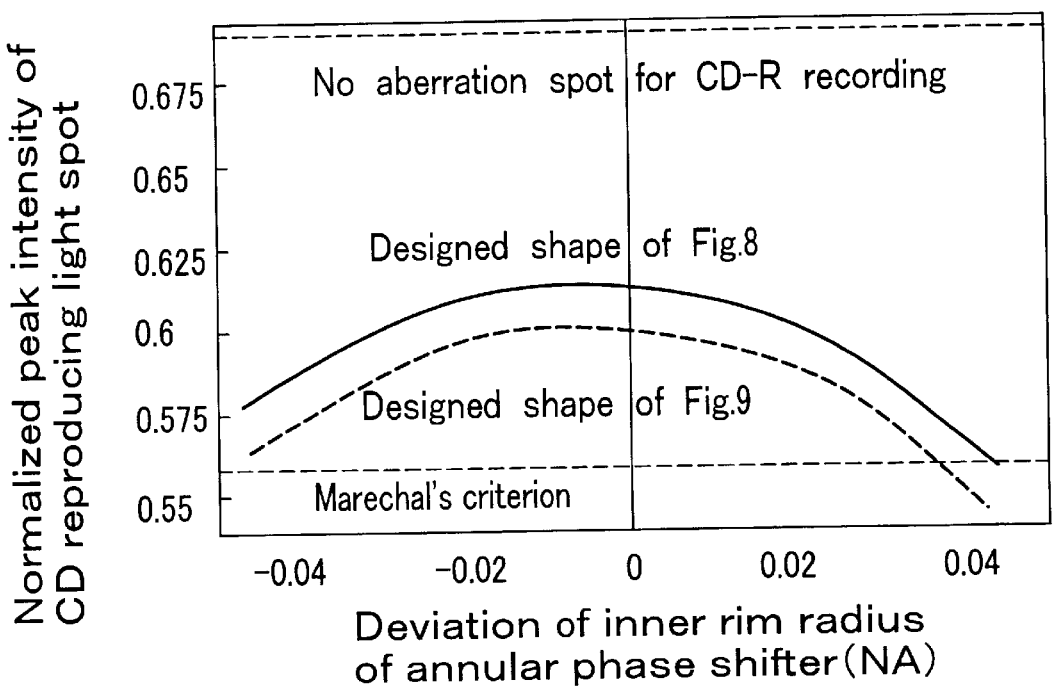
FIG. 21 is diagram showing normalized center peak intensity of the CD-R light spot versus the NA of the inner rim radius of the annular region in a design example shown in FIG. 8 and FIG. 9.

FIG. 21 is a diagram showing variation of the normalized center peak intensity in the CD reproduction obtained through the calculation when only the NA defined by the angle subtending to the inner rim radius of the annular region is varied in the design example shown in FIG. 8 and FIG. 9. For example, if a tolerance is assumed to be an allowable deviation of the inner rim radius of the annular phase shifter by which the normalized center peak intensity deteriorates to effect the decrease in the margin of the Marechal's criterion to one-half the initial value, the tolerance is found to be approximately ±0.03 in NA value.

Figure 22:
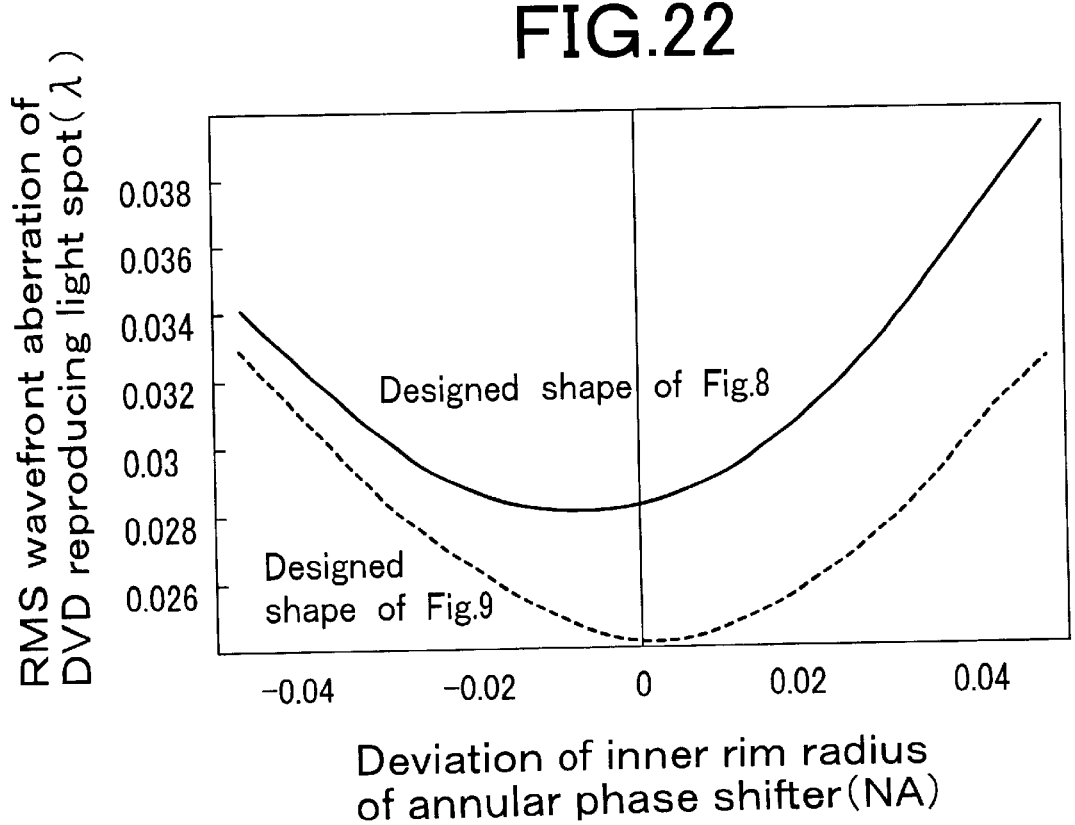
FIG. 22 is a diagram showing the RMS warfront aberration in the DVD reproduction versus the NA of the inner rim radius of the annular region in the design example shown in FIG. 8 and FIG. 9.

FIG. 22 is a diagram showing variation of the RMS wavefront aberration in the DVD reproduction obtained through the calculation when only the NA defined by the angle subtending to the inner rim radius of the annular region is varied, in the similar manner as in FIG. 21. The results of FIG. 22 indicates a wider allowable deviation of the inner rim radius of the annular phase shifter, which stands in contrast to the deterioration of the normalized center peak intensity of the CD reproducing light spot shown in FIG. 19, and it is found that the increment in the RMS wavefront aberration of the DVD reproducing light spot due to the deviation of the inner rim radius of the annular phase shifter as large as the above-mentioned ±0.03 (NA) hardly causes the deterioration of the normalized center peak intensity, when considering the Marechal's criterion that requires the RMS wavefront aberration of $0.07\lambda$.

Figure 23:
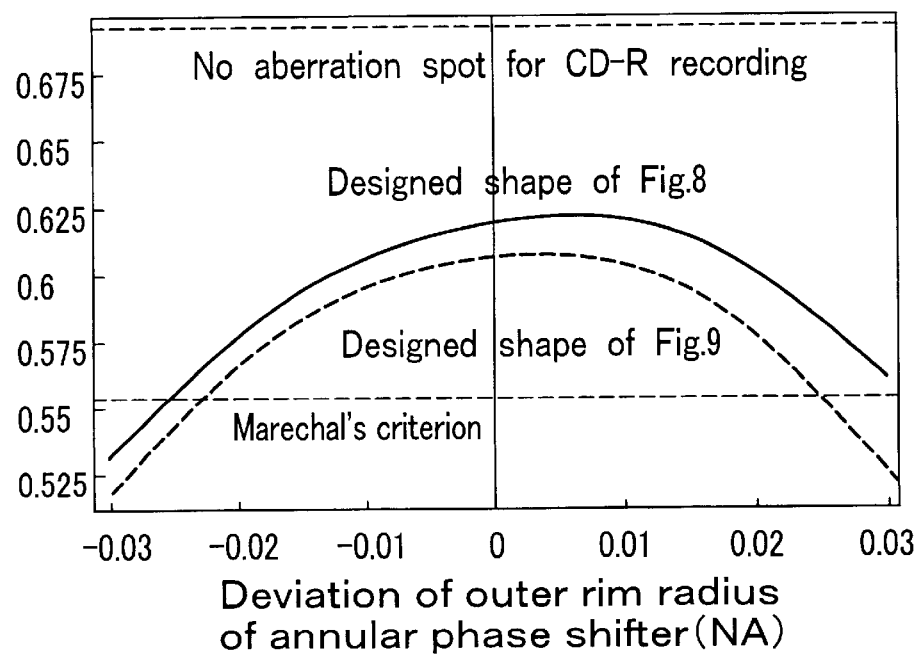
FIG. 23 is a diagram showing the normalized center peak intensity of CD-R light spot versus the NA of the outer rim radius of the annular region in the design example shown in FIG. 8 and FIG. 9.

FIG. 23 is a diagram showing variation of the normalized center peak intensity in the CD reproduction obtained through the calculation when only the NA defined by the angle subtending to the outer rim radius of the annular region is varied in the design example shown in FIG. 8 and FIG. 9. For example, if a tolerance is assumed to be an allowable deviation of the outer rim radius of the annular phase shifter by which the normalized center peak intensity deteriorates to effect the decrease in the margin of the Marechal's criterion to one-half the initial value, the tolerance is found to be approximately ±0.02 in NA value.

Figure 24:
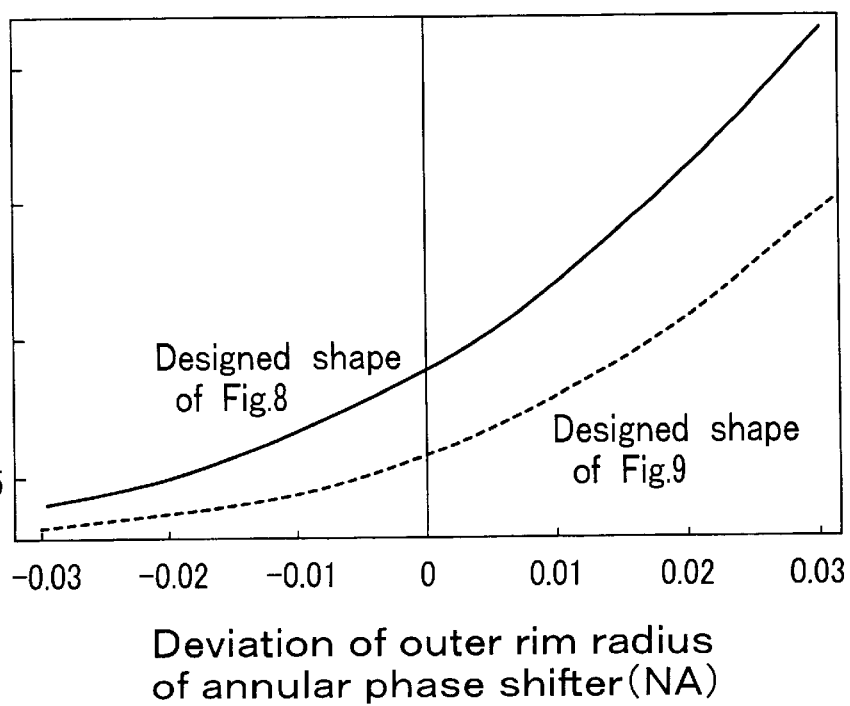
FIG. 24 is a diagram showing the RMS wavefront aberration in the DVD reproduction versus the NA of the outer rim radius of the annular region in the design example shown in FIG. 8 and FIG. 9.

FIG. 24 is a diagram showing variation of the RMS wavefront aberration in the DVD reproduction obtained through the calculation when only the NA defined by the angle subtending to the outer rim radius of the annular region is varied, in the similar manner as in FIG. 23. Unlike the influences of the deviations of the radius of the circular region and the inner rim radius of the annular region, the larger the outer rim radius of the annular region, the larger the aberration; the smaller the outer rim radius, the smaller the aberration. The is because, in the design of the present embodiment, the outer rim radius of the annular region is set to coincide with the boundary of the change of the optimum substrate thickness. In other words, the larger the outer rim radius of the annular region, the wider the region having a substrate thickness closer to the optimum substrate thickness in the CD reproduction, so that the aberration in the DVD reproduction becomes larger. However, the results also indicates that the deviation of the outer rim radius of the annular region as large as the above-mentioned ±0.02. (NA) results only in a wavefront aberration of 0.04λ or less; therefore it is found not to cause a serious problem.

Figure 25:
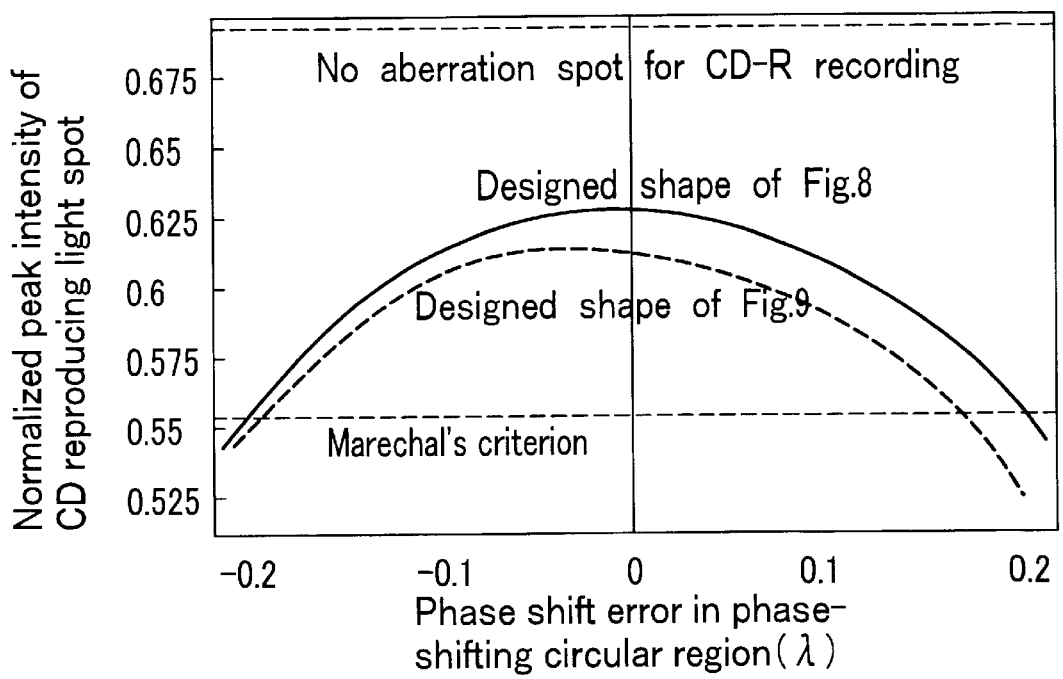
FIG. 25 is a diagram showing the normalized center peak intensity of the CD-R light spot versus the phase shift error in the phase-shifting circular region in the design example shown in FIG. 8 and FIG. 9.

FIG. 25 is a diagram showing variation of the normalized center peak intensity of the CD-R light spot as a function of the phase shift error in the phase-shifting circular region obtained through the calculation in the design example shown in FIG. 8 and FIG. 9. For example, if a tolerance is assumed to be an allowable phase shift error in the phase-shifting circular region by which the normalized center peak intensity deteriorates to effect the decrease in the margin of Maretial's criterion to one-half the initial value, the tolerance, namely allowable phase shift error in the circular region, is found to be approximately ±0.1λ.

Figure 26:
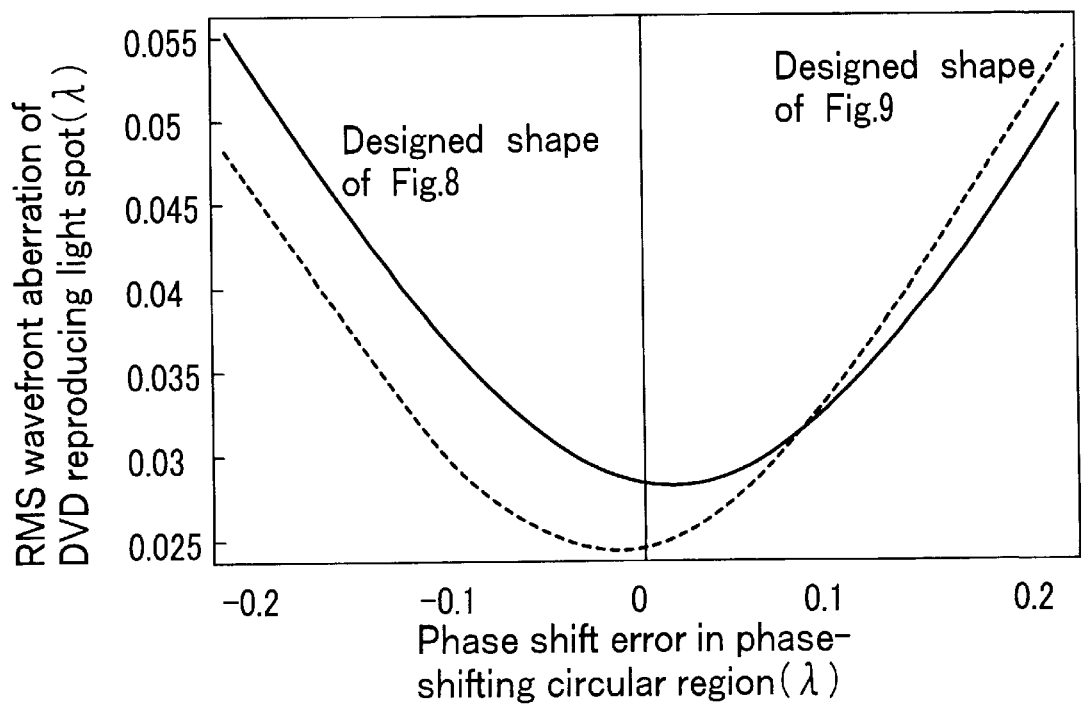
FIG. 26 is a diagram showing the RMS wavefront aberration in the DVD reproduction versus the phase shift error in the phase-shifting circular region in the design example shown in FIG. 8 and FIG. 9.

FIG. 26 is a diagram showing variation of the RMS wavefront aberration in the DVD reproduction obtained through the calculation when the phase shift error in the phase-shifting circular region is varied, in the similar manner as in FIG. 25. Regarding also this characteristic, it is found that the deterioration of the RMS wavefront aberration in the DVD reproduction due to the variation of the phase shift error in the circular region as large as the above-mentioned ±0.1λ is 0.01λ or so, which hardly affects the normalized center peak intensity.

Figure 27:
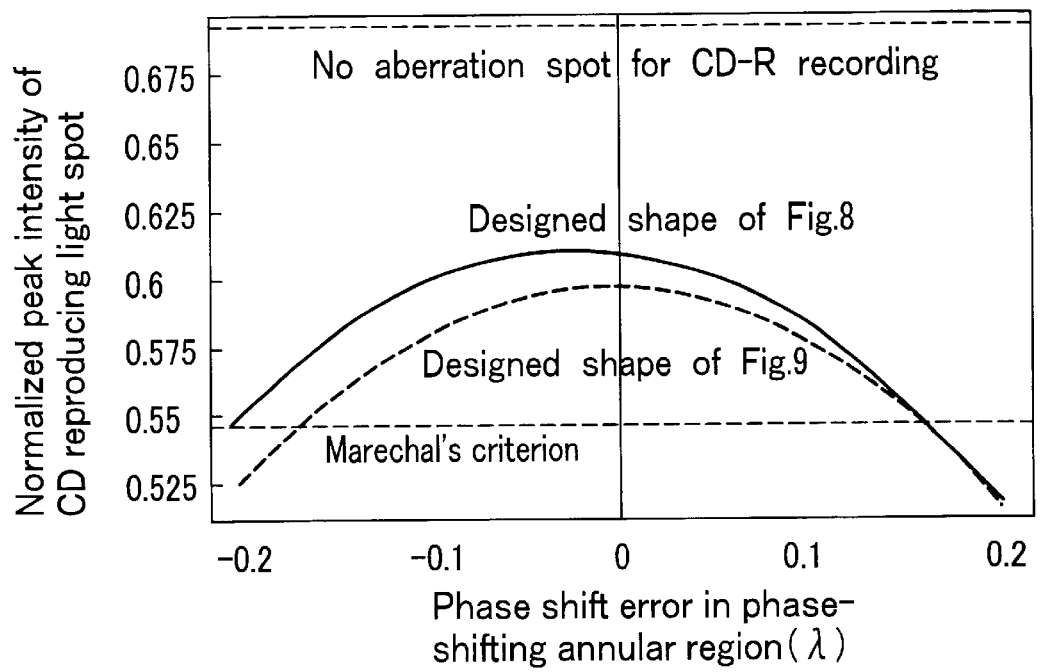
FIG. 27 is a diagram showing the normalized center peak intensity of the CD-R light spot versus the phase shift error in the phase-shifting annular region in the design example shown in FIG. 8 and FIG. 9.

FIG. 27 is a diagram showing variation of the normalized center peak intensity of the CD-R light spot as a function of the phase shift error in the phase-shifting annular region obtained through the calculation in the design example shown in FIG. 8 and FIG. 9. For example, if a tolerance is assumed to be an allowable phase shift error by which the normalized center peak intensity deteriorates to effect the decrease in the margin of Marechal's criterion to one-half the initial value, the tolerance, namely allowable phase shift error in the annular region, is found to be approximately ±0.1λ as in the circular region.

Figure 28:
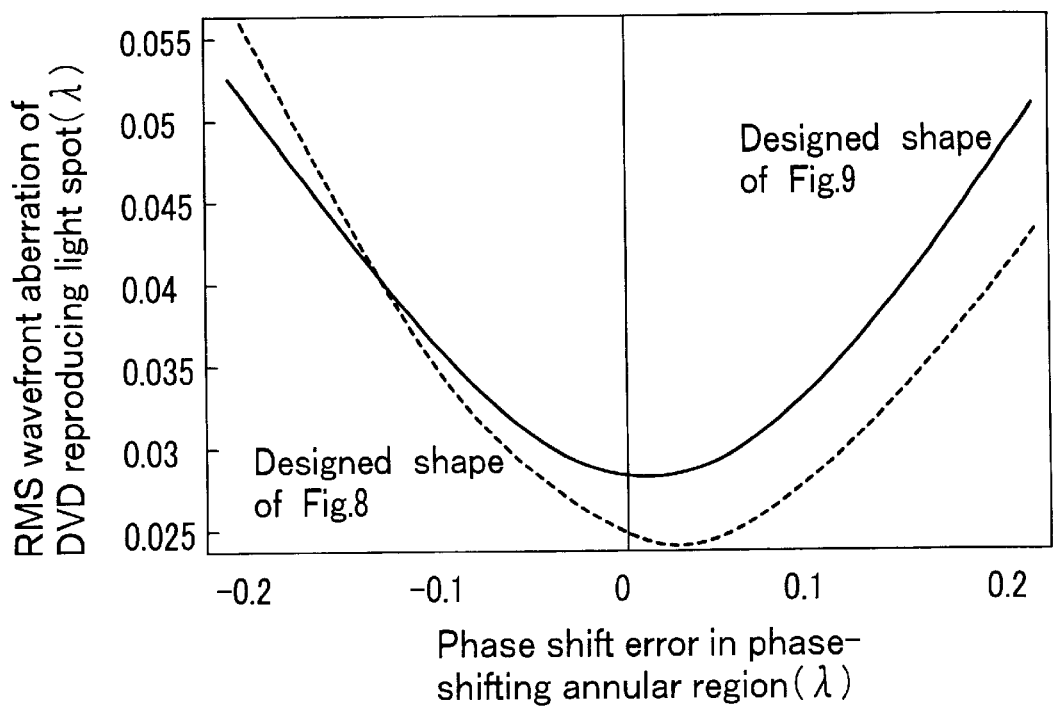
FIG. 28 is a diagram showing the RMS wavefront aberration in the DVD reproduction versus the phase shift error in the phase-shifting annular region in the design example shown in FIG. 8 and FIG. 9.

FIG. 28 is a diagram showing variation of the RMS wavefront aberration in the DVD reproduction obtained through the calculation when the phase shift error in the annular region is varied, in the similar manner as in FIG. 27. Regarding also this characteristic, it is found that the deterioration of the RMS wavefront aberration in the DVD reproduction due to the variation of the phase shift error in the annular region as large as the above-mentioned ±0.1λ is 0.01λ or so, which hardly affects the normalized center peak intensity. In optimizing the design, it was assumed that the phase shifts in the circular region and the annular region were equal in the absolute value and have opposite signs to each other.

However, as can be understood from the results of FIGS. 25, 26, 27, and 28, even under such a condition that independent phase shifts are given to respective regions as initial values, a designed shape that is almost the same as the previous designed shape is obtained; therefore it was found the designed shape based on the above-mentioned assumption have already reached almost optimum value.

Figure 29:
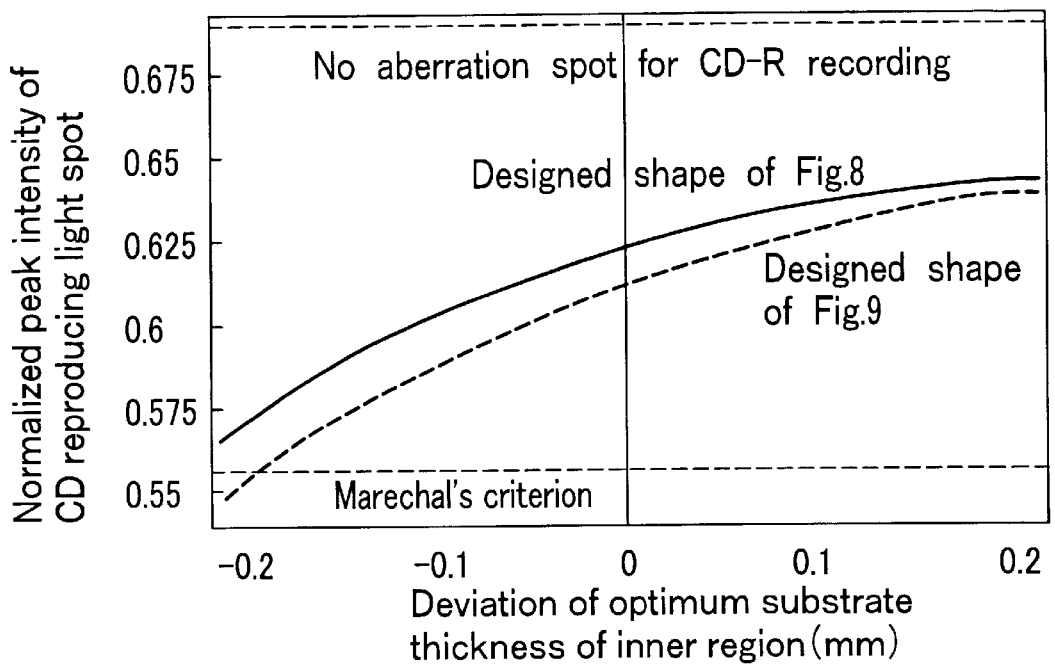
FIG. 29 is a diagram showing the normalized center peak intensity of the CD-R light spot versus the deviation of the optimum substrate thickness of the inner region in the design example shown in FIG. 8 and FIG. 9.

FIG. 29 is a diagram showing variation of the normalized center peak intensity of the CD-R light spot obtained through the calculation when the optimum substrate thickness of the inner region is varied in the design example shown in FIG. 8 and FIG. 9. For example, if a tolerance is assumed to be a deviation of the optimum substrate thickness by which the normalized center peak intensity deteriorates to effect the decrease in the margin of the Maretial's criterion to one-half the initial margin, the tolerance is found to be approximately −0.05 mm. Regarding the deviation of the optimum substrate thickness toward a larger thickness, the normalized center peak intensity becomes larger on the contrary because such a deviation causes the substrate thickness to get closer to the optimum substrate thickness for the CD.

Figure 30:
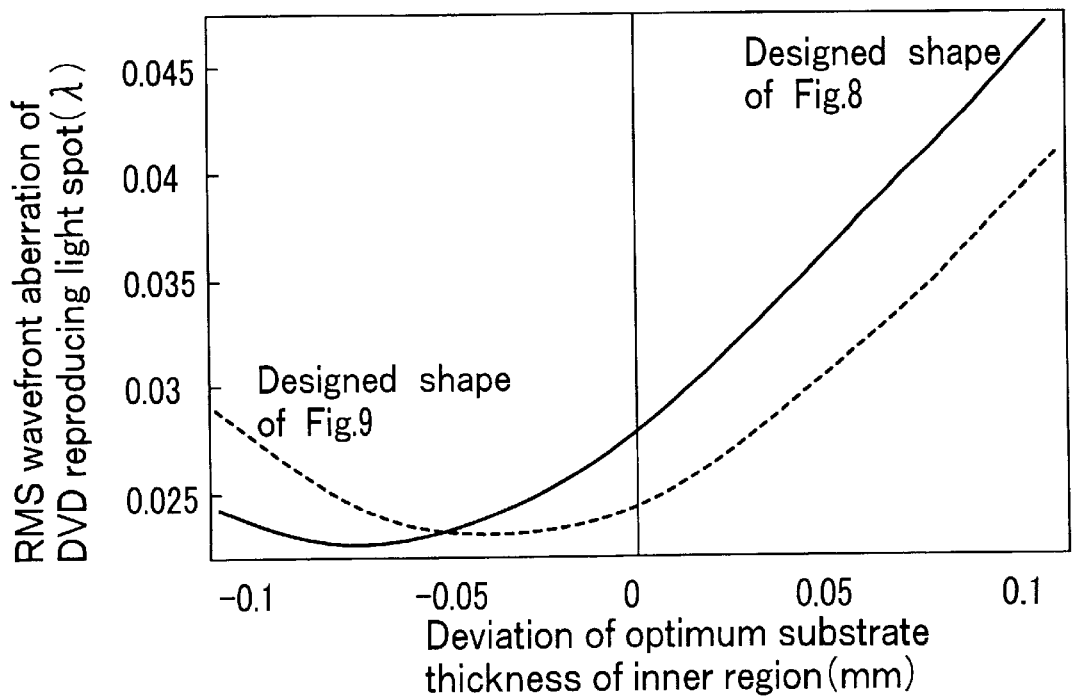
FIG. 30 is a diagram showing the RMS wavefront aberration in the DVD reproduction versus the deviation of the optimum substrate thickness of the inner region in the design example shown in FIG. 8 and FIG. 9.

FIG. 30 is a diagram showing variation of the RMS wavefront aberration of the DVD reproducing light spot obtained through the calculation when the optimum substrate thickness of the inner region is varied, in the similar manner as in FIG. 29. Regarding the deviation of the optimum substrate thickness toward a larger thickness, contrary to the case in FIG. 29, the RMS wavefront aberration becomes larger because such a deviation causes the substrate thickness to deviate farther from the optimum substrate thickness for the DVD, 0.6 mm. On the contrary, when the substrate thickness becomes thinner, the aberration becomes smaller because the substrate thickness gets closer to the optimum substrate thickness for the DVD. From the results, if a tolerance of the RMS wavefront aberration for the DVD is assumed to be, for example, 0.04λ or so, the allowable deviation of the optimum substrate thickness of the inner region is found to be +0.05 mm.

From the results of FIG. 29 and FIG. 30, it is found that the tolerance, namely the allowable deviation of the optimum substrate thickness of the inner region, is ±0.05 mm or so.

FIG. 31 summarizes ranges of the parameters of the optimum lens shape and their tolerances. In the left column of the table, shown are the lower limits and the upper limits of the range of the optimum lens shape for the effective NA for CD-R shown in FIGS. 4, 5, 6, and 7. Here, the lower limits and upper limits represent design values corresponding to the lower limit and upper limit of the effective NA in which the Marechal's criterion for the CD is satisfied. Moreover, the tolerances of the parameters that are shown in FIG. 19 to FIG. 30 are shown in a next column. Each of the tolerances, as already stated, indicates the allowable deviation or error of a parameter that causes the normalized center peak intensity of the CD-R light spot to deteriorate to effect the decrease in the margin of the Marechal's criterion to one-half the initial value. It was separately confirmed that any increase of the RMS wavefront aberration for the DVD due to each of these tolerances caused almost no problems. The lower limit and the upper limit of each of the parameters when each of these tolerances is combined with a possible design range for the parameter is shown in the next column of an integrated allowable range. In performing the combination, a wider allowable range is chosen for each of the parameters. Consequently, it can be concluded that the allowable ranges of the parameters in which the present invention can exhibit the intended effect lie in these ranges.

Figure 32:
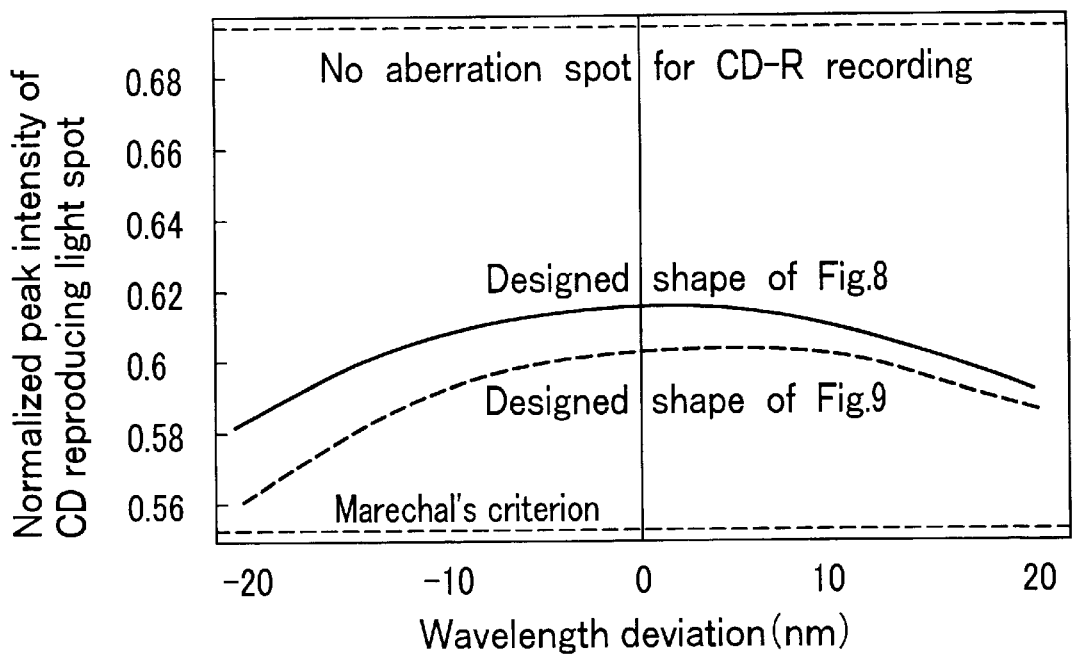
FIG. 32 is a diagram showing the normalized center peak intensity of the CD-R light spot versus the deviation of the wavelength thereof in the design example shown in FIG. 8 and FIG. 9.

Further, FIG. 32 is a diagram showing variation of the normalized center peak intensity of the CD-R light spot obtained through the calculation when the wavelength of the CD reproducing light spot is varied in the design example shown in FIG. 8 and FIG. 9. From FIG. 32, if a tolerance is assumed to be an allowable deviation of the wavelength by which the normalized center peak intensity is caused to deteriorate to effect the decrease in the margin of the Marechal's criterion to one-half the initial value, the tolerance is found to be ±15 nm or so, as the deviation from the designed specification of this embodiment, 785 nm. This tolerance of the wavelength falls almost within the specification of normal laser diodes.

Figure 33:
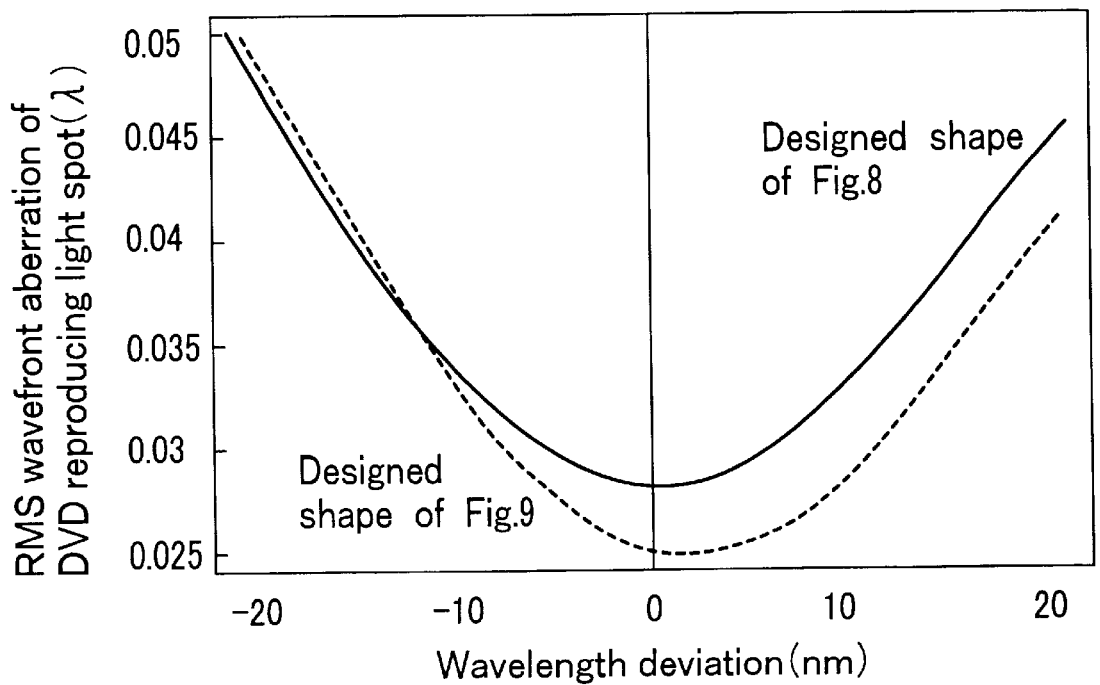
FIG. 33 is a diagram showing the RMS wavefront aberration in the DVD reproduction versus the deviation of the wavelength thereof in the design example shown in FIG. 8 and FIG. 9.

FIG. 33 is a diagram showing variation of the RMS wavefront aberration in the DVD reproduction obtained through the calculation when the wavelength for the reproduction of the DVD is varied. From the figure, if an allowable wavefront aberration for the DVD is assumed to be, for example, $0.04\lambda$, the tolerance, namely the allowable deviation of the wavelength, is found to be $\pm 15$ nm ore so, as the deviation from the designed specification of this embodiment, 655 nm. This tolerance of the wavelength falls almost within the specification of normal laser diodes, as in the case of the 785 nm wavelength laser diode described above.

Figure 34:
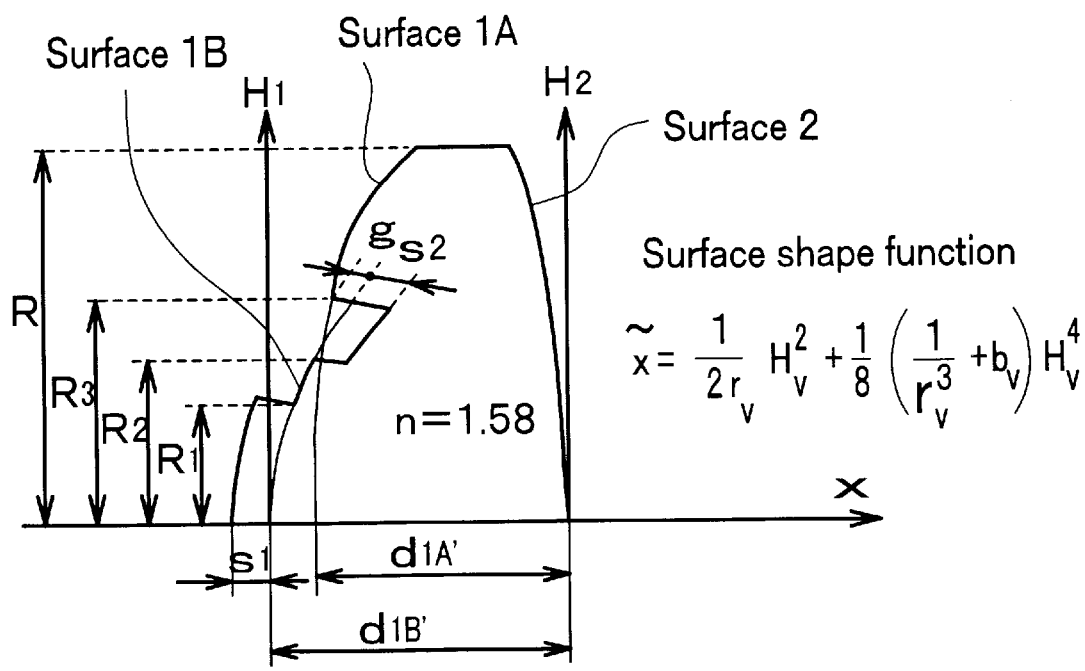
FIG. 34 is a diagram showing an actual shape of the objective lens in conformity to the design specifications shown in FIG. 8.

FIG. 34 is an actual form of one embodiment of the lens in conformity to the design specifications shown in FIG. 8. In designing the lens, based on Yoshiya Matsui, "Lens Design Method," KYORITSU SHUPPAN CO., LTD., 1989, the seventh impression of the first edition, first, a shape of the peripheral region of a first plane as well as a radius of curvature, an aspherical coefficient, and a thickness of a second plane are defined so that the third order spherical aberration for a substrate thickness of 0.6 mm, which is matched to the DVD specification, and the third order coma aberration for the angle of view are simultaneously set to zero. At this stage of the design, the reproduction of the CD and the influence of the phase shifters are not taken into account at all. Next, the shape of the inner region of the first plane is designed, still with the exclusion of the influence of phase shifters, so that the wavelength aberration profile shown in FIG. 8 but without the contributions of the phase shifters is obtained. Under the condition that a phase shift except the phase shift of the annular phase shifter at the boundary of the change of the optimum substrate thickness and the difference of paraxial focal positions for the inner region and for the outer region are satisfied, the radius of curvature and the aspherical coefficient of the inner region of the first plane and the thickness are defined, as in the case mentioned above, so that the third spherical aberration becomes zero when a parallel flat plate having an optimum substrate thickness of the inner region specified in FIG. 8 is disposed in the optical path. Then, on this shape so designed, phase shifters whose specifications are described in FIG. 8 are embodied in physical steps of appropriate depths, taking into account the refractive index of the objective lens, and arranged at positions of specified radii. At this time, an edge of the circular phase shifter and edges of the annular phase shifter are compensated slightly in terms of the depth of its step or its direction in consideration of the traveling direction of the ray, that is, among rays entering the lens in parallel to the optical axis thereof, rays entering the lens at positions away from the optical axis refract obliquely on the first plane; therefore, in order to add a desired phase shift to each of such obliquely traveling rays, it is necessary to add the phase shift along the direction of the refraction of each ray in an actual design. By the way, in the present embodiment, the influence of the coma aberration is not considered in calculating the shape of the inner region of the first plane. To design a lens considering this effect, what is necessary is to provide an inner region also on the second plane. In general, in order to reduce the spherical aberration and the coma aberration for the angle of view simultaneously to zero in an aspherical objective lens, it is necessary to design both the first plane and the second plane to be aspherical planes. According to this principle, in the inner region having the optimum substrate thickness of the inner region, in order to reduce the third coma aberration coefficient for the angle of view to zero, it is also inevitable for the lens to be provided with two exclusive aspherical planes. Therefore, in cases where the coma aberration to the angle of view becomes a problem, what is to be done is only to design a lens having different shapes in an inner region and in an outer region on each plane thereof. FIG. 34 is the actual form of the lens showing calculated parameters in the expression for plane shape profile of v-th plane such as: the radii of curvature for the outer region of the first plane (the $1_A$ plane), of the inner region of the first plane (the $1_B$ plane), of the second plane $R_{1A}$, $R_{1B}$, $R_2$; fourth aspherical coefficients of the above-mentioned radii $b_{1A}$, $b_{1B}$, $b_2$; a spacing on the optical axis between the $1_A$ plane and the second plane $d_{1A}$; a spacing on the optical axis between the $1_B$ plane and the second plane $d_{1B}$; discontinuity at the outer rim of the annular region except the step for the phase shift at the inner rim of the annular region g; phase shifts, $s_1$, $s_2$; boundary radii of the phase shifters, $R_1$, $R_2$, $R_3$; an effective lens diameter 2R; and the numerical aperture NA.

Figure 35:
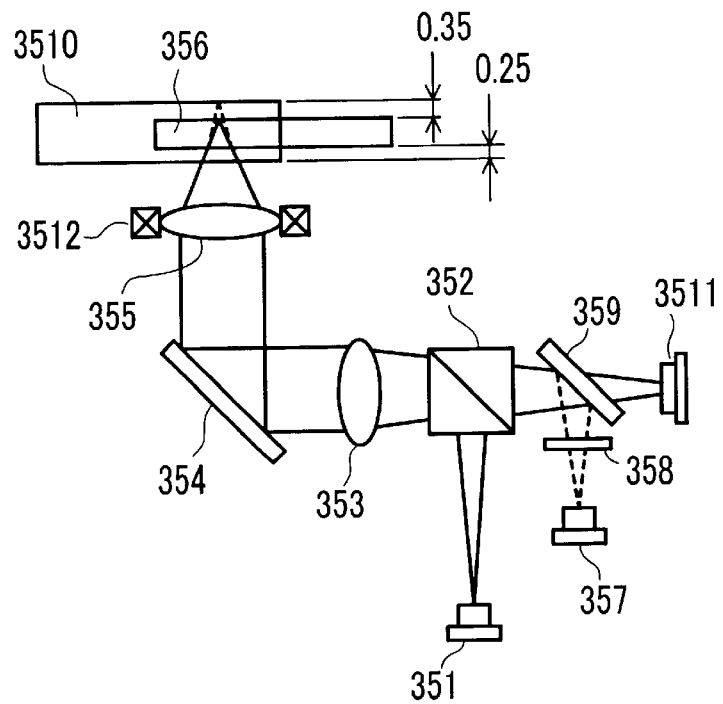
FIG. 35 is a diagram showing an optical head with the use of the objective lens according to the present invention.

FIG. 35 is a diagram showing one embodiment of the optical head with the use of the objective lens according to the present invention. Light from a laser diode 351 for DVD of the 650 nm wavelength is reflected by the beam splitter 352, transformed to a parallel beam by the collimator lens 353, reflected by the reflecting mirror 354, and focused onto the recording layer surface of the DVD disk 356 whose substrate thickness is 0.6 mm by the objective lens 355 according to the present invention. On the other hand, light from a laser diode 357 for CD of the 780 nm wavelength is first transmitted a diffraction grating 358 which is arranged to obtain the tracking signal by the three beams method, reflected by a surface of the half mirror 359, transmitted by the beam splitter 352, transformed to a parallel beam by the collimator lens 353, reflected by the reflecting mirror 354, and focused onto the recording layer surface of the CD disk 3510 whose substrate thickness is 1.2 mm by the objective lens 355 according to the present invention. A rotation angle of the diffraction grating 358 about the optical axis is adjusted so that sub spots by the diffraction grating 358 are arranged with a displacement of one-half the track in the disk radial direction with respect to the 0th order light. By the way, the tracking of the CD can be performed by the so-called push-pull method in the light of specifications and when this method is solely used, the diffraction grating becomes unnecessary. By the way, the reflector mirror 354 is arranged in the figure so as to reflect the light upward because of ease of drawing, but in an actual design preferably, for the arrangement of the optical head, the reflector mirror 354 is arranged so as to reflect the light in a vertical direction to the plane of the figure. At this time, the position of the recording layer surface in the DVD disk 356 and that in the CD disk 3510 differ by the amount of (difference of the substrate thicknesses) times (substrate refractive index $-1$) in a direction of the optical axis. The refractive index of the substrate is approximately 1.58; therefore this value is approximately 0.35 mm. Consequently, a working distances, that is, the distance from the surface of the objective lens to the surface of the disk substrate (CD or DVD) in the CD reproduction and in the DVD reproduction differs by 0.25 mm. Light reflected by the DVD or CD disk retraces the same optical path as follows: first being transformed to a parallel beam again by the objective lens 355, reflected by the reflecting mirror 354, then transformed to convergent light by the collimator lens 353, transmitted through the beam splitter 352 and the half-mirror 359, and finally focused onto the photodetector 3511. Here, the half-mirror 359 is formed in a parallel and flat plate and introduces astigmatism in the convergent light when it passes therethrough. This astigmatism is used for the astigmatism focus error detection system whereby a focus error signal is detected. For this purpose, a light receiving plane of the photodetector 3511 is quartered into four quadrant light detecting areas and electric signals from these areas are calculated to detect not only a focus error signal but also a tracking error signal. These positional control signals are used as driving signals of an objective lens actuator 3512 on which the objective lens 355 is mounted to effect the controlling of the focal position. Here, preferably the beam splitter 352 is specifically a dichroic polarizing beam splitter in terms of light utilization efficiency. That is, the laser diode 351 is arranged so that its 650 nm wavelength light enters the beam splitter 352 as s-polarized light and hence the light is made to be reflected by almost 100%. Further, a quarter wave plate (not shown in the figure) is disposed at a place in an optical path from the collimator lens 353 to the objective lens 355 so that the focused light on the disk becomes circularly polarized light. Then, when the reflected light from the disk passes through the quarter wave plate again, the light is transformed to a linearly polarized light having a polarization direction orthogonal to that of the first incident light, namely p-polarized light, and enters the beam splitter 352. Then, the p-polarized light passes through the beam splitter 352 by almost 100% and is focused onto the photodetector 3511. On the other hand, since the light from a laser diode for CD of the 780 nm wavelength should be transmitted through the beam splitter, the transmittance of the beam splitter 352 for the 780 nm wavelength light is made to be as close to 100% as possible. Further, regarding the 780 nm wavelength light, because the reflected from the disk should be also transmitted through the beam splitter 352, the transmittance for the 780 nm wavelength light is preferably close to 100% regardless of its polarization direction. In addition, the configuration of the two laser diodes described above is not necessarily fixed. Since, from the point of view of light utilization efficiency, the position of the laser diode 351 can give higher efficiency compared to the position of the laser diode 357 in design, in case the 780 nm wavelength light needs higher light utilization efficiency to perform the recording of the CD-R, it is also effective for the 780 nm wavelength laser diode to be arranged at the position of the laser diode 351 instead. However, in this case it is necessary to dispose the diffraction grating 358 between the positions of the laser diode 351 and beam splitter 352. Further, alternatively, when the 650 nm wavelength laser diode needs higher light utilization efficiency than that for the recording of the CD-R in order to perform the recording of the DVD-RAM etc., it is again effective for the 650 nm wavelength laser diode 351 to be arranged at the position of the laser diode 351 as described in the present embodiment.

Further, in the objective lens according to the present invention, both the 780 nm wavelength light and the 650 nm wavelength light are assumed to enter the objective lens as parallel beams. Therefore the reflected light retraces its optical path for two wavelengths and the retraced optical paths are almost identical with each other, and hence can be detected with a single photodetector 3510, as described in the present embodiment. As mentioned in the conventional example, in a compensation method where the spherical aberration introduced by the error of the substrate thickness is compensated with the spherical aberration introduced by the objective lens due to a configuration such that a convergent/divergent condition of the incident bundle of rays upon the objective lens is made to be different for the two wavelengths, naturally the optical paths of the two reflected bundle of rays become different for the two wavelengths. Therefore, the conventional method like this needs two photodetectors, hence becoming disadvantageous in terms of fabrication cost.

However, the present invention does not necessarily require both two beams of light of different wavelengths to be parallel beams at the same time. That is, in order to devise such a configuration, it is only necessary to do the following procedure: making convergent/divergent conditions of the two incident beams of different wavelengths different within a range that satisfies the allowable relative positional displacement between the laser diode and the objective lens so that the spherical aberration due to the error of the substrate thickness is first compensated with this effect to some extent, and then compensating the residual spherical aberration with the objective lens according to the present invention. Such a design is also very possible.

Figure 36:
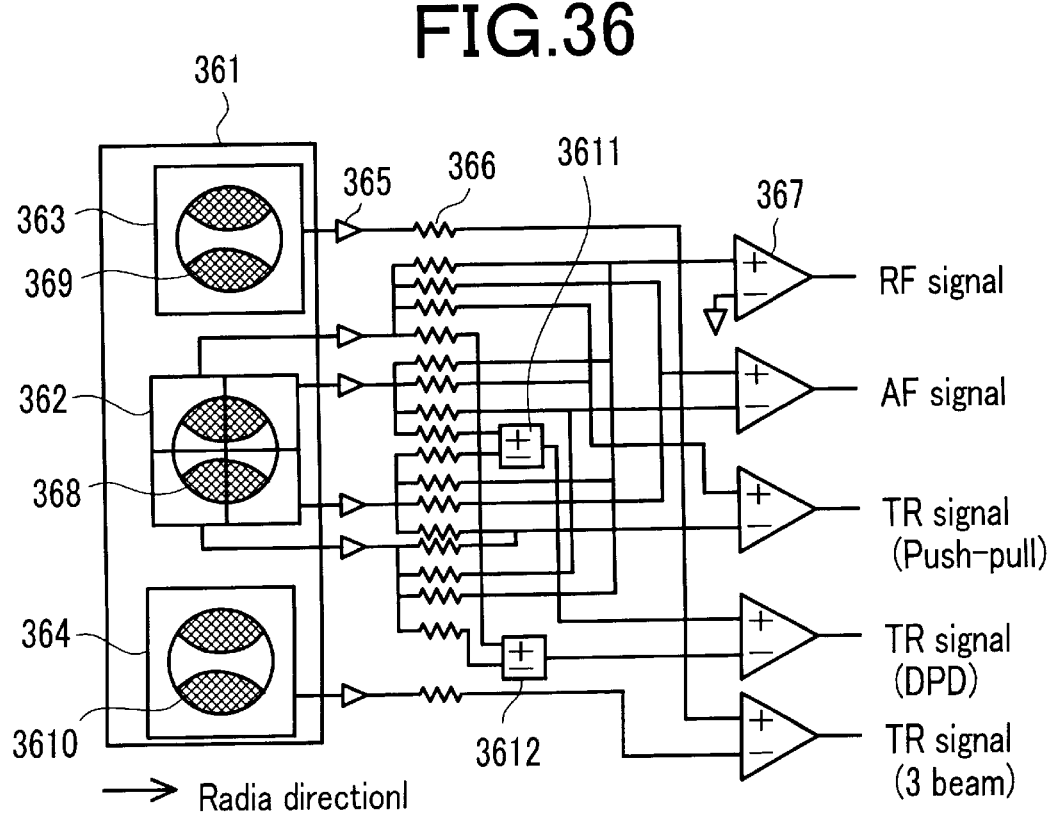
FIG. 36 is a diagram for explaining operation method of signals from a photodetector.

FIG. 36 is a block diagram explaining a scheme whereby a reproduction signal (RF signal), a focus error signal (AF signal), and tracking error signals (TR signal) are obtained from the detection signals of the photodetector 361. The figure shows an embodiment wherein the focus error signal by the focus error detection through the use of astigmatism is detected and also, regarding the tracking signal, three kinds of signals are detected: the tracking error signal by the push-pull method (PP signal), the tracking error signal by the differential phase detection method (DPD signal), and tracking error signal by the three beams method (three-beam signal). The detector 361 comprises four quadrant light detecting areas 362 and sub spot detecting areas 363, 364. A photoelectric current from each light detecting area is converted to a voltage by a current-voltage conversion amplifier 365 and entered into a differential amplifier 367 via a resistor 366, whose output is to be used in various signal processing. The RF signal outputs the total light amount of the main spot 368, which is obtained by an additive operation of adding each output from each quadrant light-detecting area 362 altogether.

In the embodiment, the AF signal is obtained through the astigmatism focus error detection method, which is carried out in a configuration where signals from each pair of two quadrant areas located diagonally in the quadrant light detecting areas 362 for detecting the main spot 368 are added and subtraction of results of two pairs thus obtained is performed to find their difference. The astigmatism method is a method whereby astigmatism is introduced in a detection bundle of rays and mutually orthogonal linear focal lines generated in front of and behind the focus are utilized to detect the tracking error signal.

The method based on the PP signal is a detection method mainly used for the recordable optical disk, whereby the tracking error signal is detected by using a phenomenon that a light intensity distribution resulted from interference of diffracted beams that are diffracted by guiding grooves formed periodically on the disk exhibits imbalance when there exists relative positional displacement between the focused spot and the guiding grooves. The recordable optical disks includes, specifically, the DVD-RAM disk, a magneto-optical disk, the CD-R disk, etc. Further, as already stated, this method can be applied to the tracking of the CD in the light of its specifications. The signals are operated in such a manner that output signals from each pair of two quadrant areas of the quadrant light detecting areas 362 for receiving the main light spot 368, each pair being grouped by a dividing line in a radial direction, are added and subtraction of results so added is performed for their difference to obtain a tracking error signal. By the way, in the astigmatism method, since astigmatism that is inclined by 45° to the track direction of the disk is added, a distribution on the focal plane is rotated by 90° to the incident bundle of rays.

The method based on the DPD signal is a method used for the DVD-ROM disk, whereby, when a detection bundle of rays is received with the quadrant light detecting areas, which are formed by division of a light detecting area by a disk radial line and its tangential line, and a time delay occurring between the variations of the detected light amounts in two quadrants located diagonally of the four quadrants is detected when the variations of the light amounts by the information pit are detected. Although this method is currently specified only for the DVD-R after DVD-ROM is recorded, but in principle can also be applied to the CD to detect the tracking error signal in the light of specifications. The operation of the signals is performed in such a manner that outputs from each pair of two quadrant areas located not diagonally of the quadrant light detecting areas 362 for receiving the main spot 368 are detected by a differential phase detecting circuit 3611 (3612), which calculates their differential phase and outputs as a voltage, and two voltages from the two pairs thus obtained are put into a subtractive operation to find their difference, which serves as a tracking error signal.

The method based on the three beam signals is a method which is widely used for the current CD and, as already stated, whereby two sub spots generated by a diffraction grating are arranged on a disk with a displacement of one-half the track in the radial direction from the main spot, being in a side-by-side manner, and imbalance occurring in detected light amounts of the two sub spots when the main spot is out of the information track is detected. Operation of the signals is achieved through subtraction of outputs from the two light detecting areas 363, 364 for the two sub spots 369, 3610.

Figure 37:
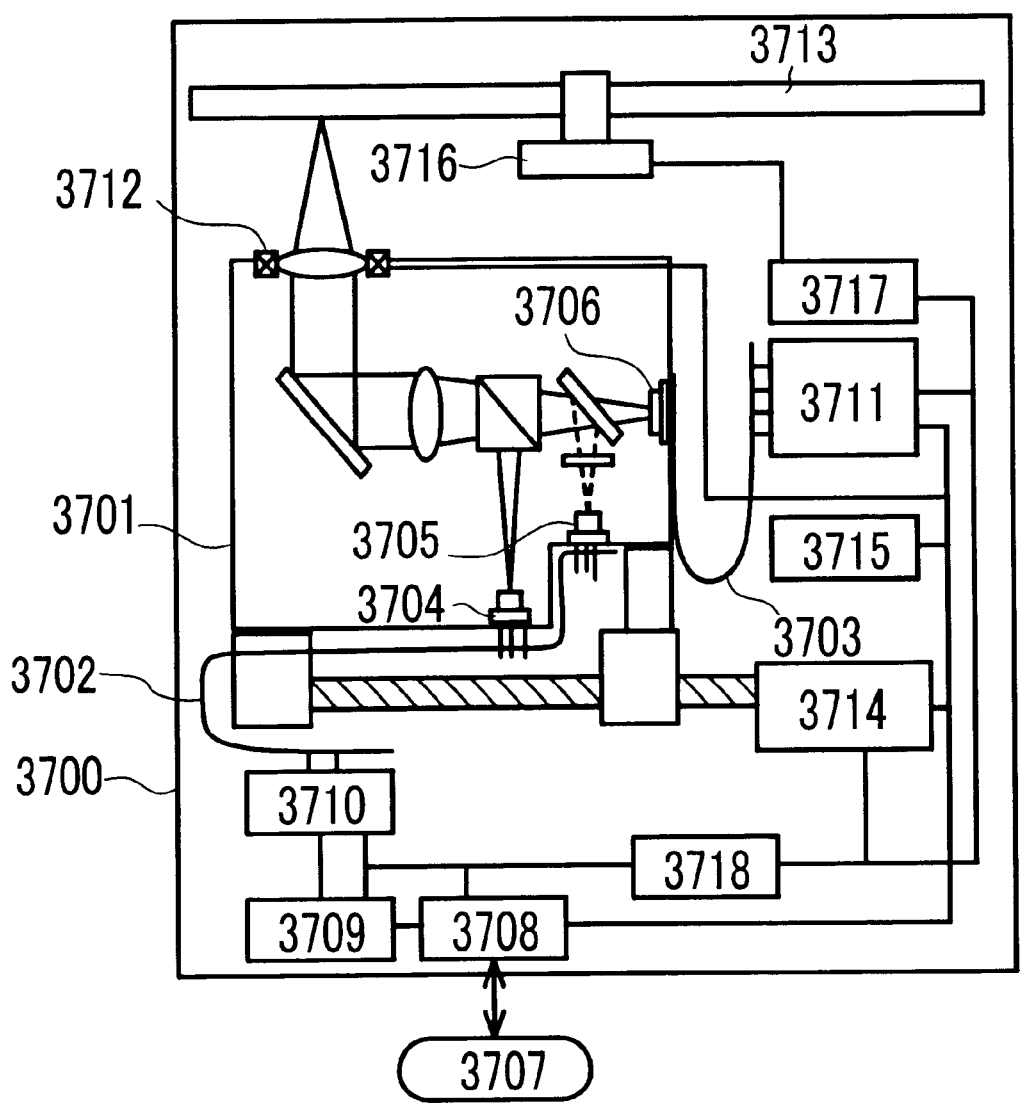
FIG. 37 is a diagram showing the optical disk apparatus on which the optical head with use of the objective lens is mounted according to the embodiment of the present invention.

FIG. 37 depicts an embodiment where the optical disk apparatus according to the present invention is used. The optical disk apparatus 3700 is composed of an optical head 3701, a control circuit and a mechanical system comprising a motor etc. Electric input/output to and from the optical head 3701 are done via flexible boards 3702, 3703. In this embodiment, the laser diodes 3704, 3705 are driven by the flexible board 3702 and the input/output of the photodetector 3706 is performed by the flexible board 3703.

The laser diodes 3704, 3705 are controlled to flash on and off by a laser driving circuit 3710 in response to a recording waveform, from a recording waveform generation circuit 3709, that is generated therein according to digital information of the buffer memory 3708 which stores user data 3707.

The output current outputted by the photodetector 3706 is converted from current to voltage, amplified by a signal operational circuit 3711, and further operated by the above-mentioned operational method to generate a focus error signal, a tracking error signal, and a head position control signal. The above-mentioned two error signals are feed-backed to an objective lens actuator 3712 and using these, the focused light spot is closed loop controlled so as to always ride on the information track of the recording layer surface of the optical disk 3713. On the other hand, the head position control signal is detected from the address information pit on the disk through the RF signal and inputted to the head translation mechanism 3714 so that the optical head 3701 is positioned to be almost in the vicinity of the reproduction track. Regarding the head position control, in the case of a magneto-optical disk for digital information recording, the head is normally closed loop controlled as well, whereas in the CD, DVD, MD, etc., it is often the case that the head is open loop controlled.

The RF signal obtained in the signal operational circuit 3711 is equalized, binary coded, and decoded in a signal processing circuit 3715 to regenerate digital information. The output information is stored in a buffer memory 3708.

The optical disk 3713 is rotated by a spindle motor 3716 and its rotation is controlled by a spindle motor driving circuit 3717. In addition, all these control circuits are controlled by a controller 3718.

The present embodiment is described of a case where a recordable optical disk is recorded/produced as an example, but also in a case of a reproduction-only optical disk such as the CD-ROM, the DVD-ROM, etc., an optical disk apparatus can be constructed with almost a similar configuration but just except the recording control system that is unnecessary in such a case.

By constructing an optical disk apparatus with the use of the optical head according to the present invention, an optical disk apparatus capable of performing the reproduction of the DVD-ROM, the reproduction of the CD-ROM, the recording/reproduction of the DVD-RAM, and the recording/reproduction of the CD-R, each of these disks serving as the optical disk 3713 for the optical disk apparatus, can be realized.

By carrying the present invention into practice, an optical disk apparatus equipped the objective lens capable of performing the reproduction of the CD-ROM, the recording/reproduction of the CD-R, the reproduction of the DVD-ROM, and the recording/reproduction of the DVD-RAM can be realized and that a low-cost optical disk apparatus excellent in compatibility can be realized.

What is claimed is:

1. An optical disk apparatus comprising:
   (a) laser diode light sources capable of emitting at least two beams of different wavelengths; and
   (b) an objective lens having at least two refraction planes for focusing said light beams emitted from said laser diodes and subsequently crossing a transparent substrate of an optical recording medium, said objective lens including a circular region, in the vicinity of an optical axis of said lens, forming a protrusion projecting forward to provide a step with respect to a region surrounding said protrusion and lying in one plane of said at least two planes, said one plane having an annular groove region, spaced from said protrusion and recessed from regions surrounding said annular groove region, to provide a step with a certain spacing from said protrusion, wherein said optical disk apparatus can perform either reproduction or reproduction/recording of each of at least two kinds of optical disks having different substrate thicknesses, and wherein, denoting an optical path difference generated by said step in said circular region as $\phi_1$, that generated by said step in said annular region as $\phi_2$, and a longer wavelength of said two wavelengths as $\lambda_1$, the following conditional expressions $1.67\lambda_1 \leq \phi_1 \leq 1.87\lambda_1$ $-1.87\lambda_1 \leq \phi_2 \leq -1.67\lambda_1$ are satisfied.

2. An optical disk apparatus comprising:
   (a) laser diode light sources capable of emitting at least two beams of different wavelengths; and
   (b) an objective lens having at least two refraction planes for focusing said light beams emitted from said laser diodes and subsequently crossing a transparent substrate of an optical recording medium, said objective lens including a circular region, in the vicinity of an optical axis of said lens, forming a protrusion projecting forward to provide a step with respect to a region surrounding said protrusion and lying in one plane of said at least two planes, said one plane having an annular groove region, spaced from said protrusion and recessed from regions surrounding said annular groove region, to provide a step with a certain spacing from said protrusion, wherein said optical disk apparatus can perform either reproduction or reproduction/recording of each of at least two kinds of optical disks having different substrate thicknesses, and wherein, denoting an optical path difference generated by said step in said circular region as $\phi_1$, that generated by said step in said annular region as $\phi_2$, and a shorter wavelength of said two wavelengths as $\lambda_2$, the following conditional expressions $2.00\lambda_2 \leq \phi_1 \leq 2.24\lambda_2$ $-2.24\lambda_2 \leq \phi_2 \leq -2.00\lambda_2$ are satisfied.

* * * * *